US009722862B2

(12) United States Patent
Baulier et al.

(10) Patent No.: US 9,722,862 B2
(45) Date of Patent: *Aug. 1, 2017

(54) COMPUTER SYSTEM TO SUPPORT FAILOVER IN AN EVENT STREAM PROCESSING SYSTEM

(71) Applicant: SAS Institute Inc., Cary, NC (US)

(72) Inventors: Gerald Donald Baulier, Apex, NC (US); Vincent L. Deters, Wake Forest, NC (US); Scott J. Kolodzieski, Apex, NC (US)

(73) Assignee: SAS Institute Inc., Cary, NC (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/806,750

(22) Filed: Jul. 23, 2015

(65) Prior Publication Data

US 2015/0358196 A1 Dec. 10, 2015

Related U.S. Application Data

(63) Continuation of application No. 14/662,528, filed on Mar. 19, 2015, now Pat. No. 9,122,651.

(60) Provisional application No. 62/008,725, filed on Jun. 6, 2014, provisional application No. 62/134,852, filed on Mar. 18, 2015.

(51) Int. Cl.
| G06F 11/00 | (2006.01) |
| H04L 12/24 | (2006.01) |
| G06F 11/20 | (2006.01) |
| G06F 9/54 | (2006.01) |
| H04L 12/58 | (2006.01) |

(52) U.S. Cl.
CPC .......... *H04L 41/0663* (2013.01); *G06F 9/542* (2013.01); *G06F 11/2007* (2013.01); *G06F 11/2028* (2013.01); *H04L 51/18* (2013.01); *G06F 11/2041* (2013.01); *G06F 2201/85* (2013.01)

(58) Field of Classification Search
CPC .................................................. H04L 41/0663
USPC .... 714/4.11, 4.12, 4.2, 4.1, 4.21, 4.3, 10–13
See application file for complete search history.

(56) References Cited

U.S. PATENT DOCUMENTS

| 5,845,280 | A | 12/1998 | Treadwell, III et al. |
| 7,051,029 | B1 | 5/2006 | Fayyad et al. |
| 9,122,651 | B1 * | 9/2015 | Baulier ............... G06F 11/2007 |
| 9,158,810 | B2 | 10/2015 | Aingaran et al. |
| 2004/0064600 | A1 | 4/2004 | Lee et al. |

(Continued)

*Primary Examiner* — Dieu-Minh Le
(74) *Attorney, Agent, or Firm* — Bell & Manning, LLC

(57) ABSTRACT

In a system, a first status of a first ESP engine (ESPE) executing at a first computing device is determined as newly active; a last published event block object identifier is determined as an identifier uniquely identifying a last event block object published to an out-messaging network device; a next event block object having an event block object identifier greater than the determined last published event block object identifier is selected from a first computer-readable medium; and the selected next event block object is published to the out-messaging network device. A first event block object is received from a second ESPE executing at a second computing device. A first status of the second ESPE is determined as standby by the second computing device. The received first event block object is stored by the second computing device in a second non-transitory computer-readable medium.

30 Claims, 18 Drawing Sheets

(56) References Cited

U.S. PATENT DOCUMENTS

| | | |
|---|---|---|
| 2005/0015437 A1 | 1/2005 | Strait |
| 2006/0153185 A1 | 7/2006 | Jain et al. |
| 2008/0062863 A1 | 3/2008 | Ginde |
| 2011/0040863 A1 | 2/2011 | Griffin et al. |
| 2012/0131139 A1 | 5/2012 | Siripurapu et al. |
| 2012/0246391 A1 | 9/2012 | Meir et al. |
| 2013/0246580 A1 | 9/2013 | Ozawa et al. |
| 2014/0047377 A1 | 2/2014 | Nos et al. |
| 2016/0117205 A1* | 4/2016 | Boyle .................. G06F 19/32 719/318 |

\* cited by examiner

COMPUTER SYSTEM TO SUPPORT FAILOVER IN AN EVENT STREAM PROCESSING SYSTEM

CROSS-REFERENCE TO RELATED APPLICATIONS

The present application is a continuation of U.S. patent application Ser. No. 14/662,528 that was filed Mar. 19, 2015, the entire contents of which are hereby incorporated by reference. The present application also claims the benefit of 35 U.S.C. §119(e) to U.S. Provisional Patent Application No. 62/008,725 filed Jun. 6, 2014, and to U.S. Provisional Patent Application No. 62/134,852 filed Mar. 18, 2015, the entire contents of which are hereby incorporated by reference.

BACKGROUND

An increasing number of distributed applications process continuously flowing data from distributed sources by applying queries to the data before distributing the data to geographically distributed recipients. An event stream processing engine (ESPE) continuously applies the queries to the data as it is received and determines which entities receive the processed data.

SUMMARY

In an example embodiment, a system is provided to support a failover when event stream processing (ESP) event blocks. The system includes, but is not limited to, a first computing device and a second computing device. The first computing device includes, but is not limited to, a first processor configured to execute a first ESP engine (ESPE) and a first non-transitory computer-readable medium comprising first computer-readable instructions stored thereon. The second computing device includes, but is not limited to, a second processor configured to execute a second ESPE and a second non-transitory computer-readable medium comprising second computer-readable instructions stored thereon.

The first computer-readable instructions cause the first computing device to determine a first status of the first ESPE executing at the first computing device as newly active; when the first status of the first ESPE is determined as newly active, to determine a last published event block object identifier as an identifier that uniquely identifies a last event block object published to an out-messaging network device; when the first status of the first ESPE is determined as newly active, to select a next event block object having an event block object identifier that is greater than the determined last published event block object identifier from the first non-transitory computer-readable medium; and when the first status of the first ESPE is determined as newly active, to publish the selected next event block object to the out-messaging network device. The second computer-readable instructions cause a second computing device to receive a first event block object from a second ESPE executing at the second computing device, wherein the first event block object includes a unique identifier of the first event block object; to determine a first status of the second ESPE as standby; and when the first status of the second ESPE is determined as standby, to store the received first event block object in the second non-transitory computer-readable medium.

In another example embodiment, a plurality of non-transitory computer-readable media are provided. The plurality of non-transitory computer-readable media includes, but are not limited to, a first non-transitory computer-readable medium comprising first computer-readable instructions stored thereon and a second non-transitory computer-readable medium comprising second computer-readable instructions stored thereon. The first computer-readable instructions cause a first computing device to determine a first status of a first event stream processing engine (ESPE) executing at the first computing device as newly active; when the first status of the first ESPE is determined as newly active, to determine a last published event block object identifier as an identifier that uniquely identifies a last event block object published to an out-messaging network device; when the first status of the first ESPE is determined as newly active, to select a next event block object having an event block object identifier that is greater than the determined last published event block object identifier from the first non-transitory computer-readable medium; and when the first status of the first ESPE is determined as newly active, to publish the selected next event block object to the out-messaging network device. The second computer-readable instructions cause a second computing device to receive a first event block object from a second ESPE executing at the second computing device, wherein the first event block object includes a unique identifier of the first event block object; to determine a first status of the second ESPE as standby; and when the first status of the second ESPE is determined as standby, to store the received first event block object in the second non-transitory computer-readable medium.

In yet another example embodiment, a method of supporting failover in an event stream processing system is provided. In the method, a first status of a first ESP engine (ESPE) executing at a first computing device is determined as newly active. A last published event block object identifier as an identifier that uniquely identifies a last event block object published to an out-messaging network device is determined by the first computing device. A next event block object having an event block object identifier that is greater than the determined last published event block object identifier is selected, by the first computing device, from a first non-transitory computer-readable medium. The selected next event block object is published to the out-messaging network device by the first computing device. A first event block object is received from a second ESPE executing at a second computing device. The first event block object includes a unique identifier of the first event block object. A first status of the second ESPE is determined as standby by the second computing device. The received first event block object is stored by the second computing device in a second non-transitory computer-readable medium Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
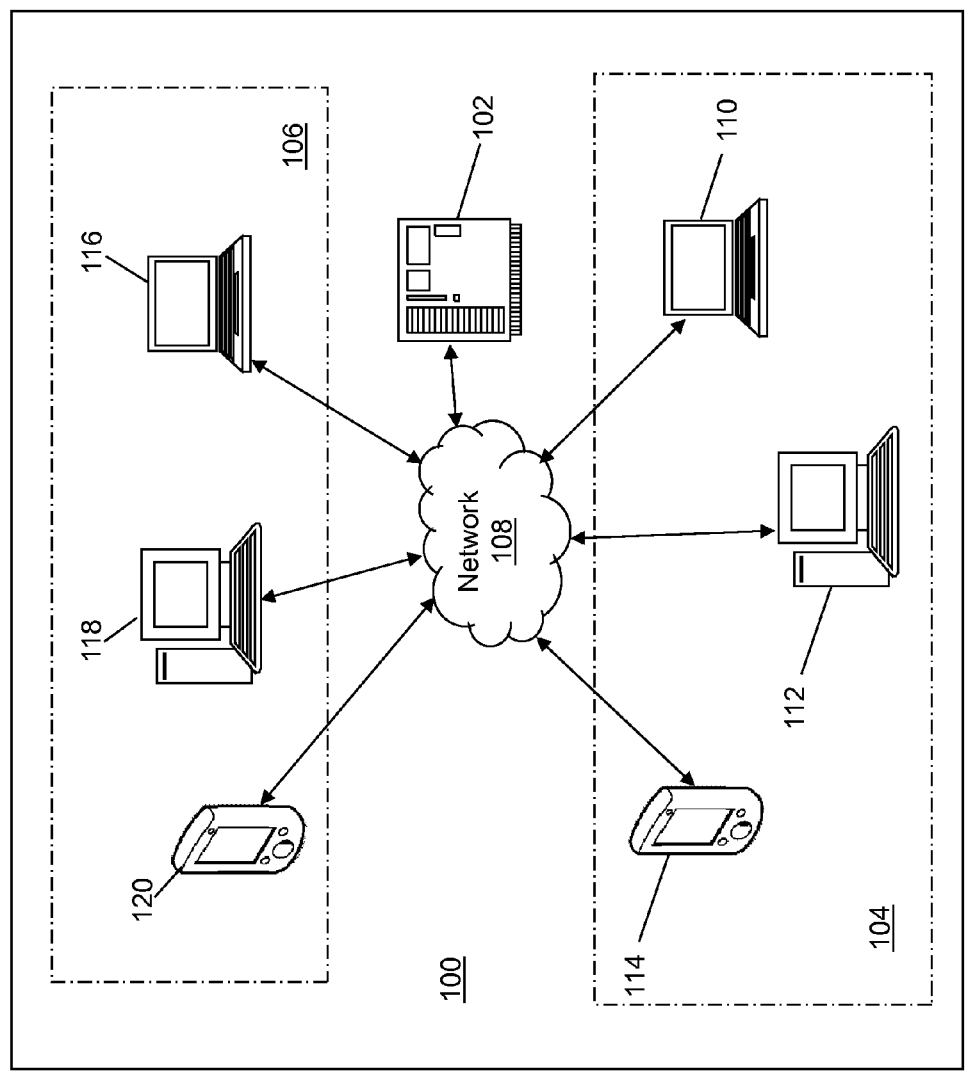
FIG. 1 depicts a block diagram of an event stream processing (ESP) system in accordance with an illustrative embodiment.

Referring to FIG. 1, a block diagram of an event stream processing (ESP) system 100 is shown in accordance with an illustrative embodiment. In an illustrative embodiment, ESP system 100 may include an ESP device 102, event publishing systems 104, event subscribing systems 106, and a network 108. The event publishing systems 104 publish data to ESP device 102, which receives the published data. ESP device 102 processes the published data. The event subscribing systems 106 subscribe to and receive the published data after processing by ESP device 102.

As used herein, the data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

The components of ESP system 100 may be included in a single computing device, may be located in a single room or adjacent rooms, in a single facility, and/or may be distributed geographically from one another. Each of ESP device 102, the event publishing systems 104, and the event subscribing systems 106 may be composed of one or more discrete devices.

Network 108 may include one or more networks of the same or different types. Network 108 can be any type of wired and/or wireless public or private network including a cellular network, a local area network, a wide area network such as the Internet, etc. Network 108 further may comprise sub-networks and consist of any number of devices.

ESP device 102 can include any type of computing device. The computing device sends and receives signals through network 108 to/from event publishing systems 104 and to/from event subscribing systems 106. ESP device 102 may communicate using various transmission media that may be wired and/or wireless as understood by those skilled in the art.

The event publishing systems 104 can include any number and type of computing devices that may be organized into subnets. The computing devices of the event publishing systems 104 send and receive signals through network 108 to/from another of the one or more computing devices of the event publishing systems 104, to/from ESP device 102, and/or to/from the event subscribing systems 106. The one or more computing devices of the event publishing systems 104 may include computers of any form factor such as a laptop 110, a desktop 112, a smart phone 114, a personal digital assistant, an integrated messaging device, a tablet computer, etc. The one or more computing devices of the event publishing systems 104 may communicate using various transmission media that may be wired and/or wireless as understood by those skilled in the art.

The event subscribing systems 106 can include any number and type of computing devices that may be organized into subnets. The computing devices of the event subscribing systems 106 send and receive signals through network 108 to/from another of the one or more computing devices of the event subscribing systems 106, to/from ESP device 102, and/or to/from the event publishing systems 104. The one or more computing devices of the event subscribing systems 106 may include computers of any form factor such as a laptop 116, a desktop 118, a smart phone 120, an integrated messaging device, a personal digital assistant, a tablet computer, etc. The one or more computing devices of the event subscribing systems 106 may communicate using various transmission media that may be wired and/or wireless as understood by those skilled in the art.

Figure 2:
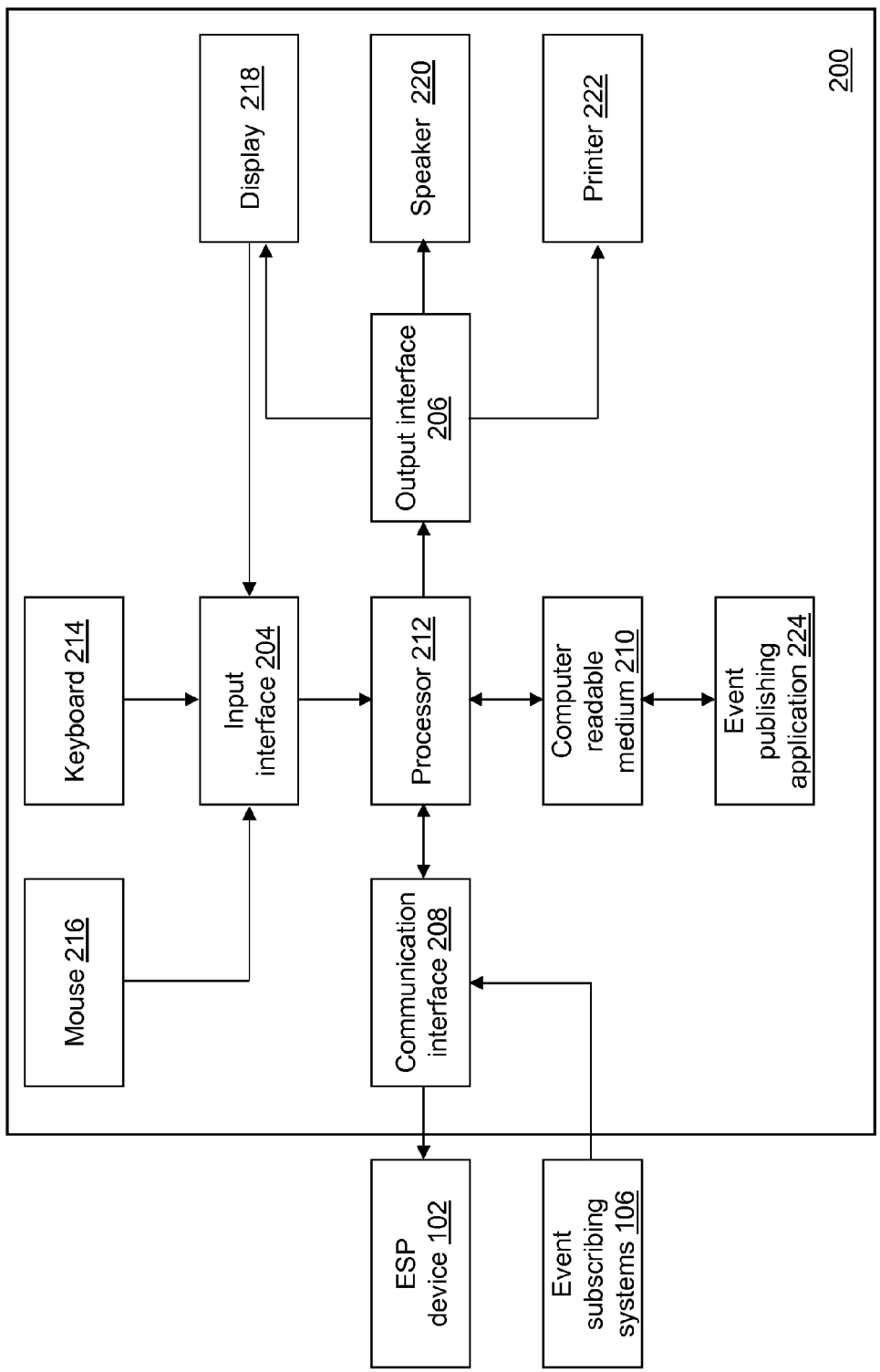
FIG. 2 depicts a block diagram of a publishing device of event publishing systems of the ESP system of FIG. 1 in accordance with an illustrative embodiment.

Referring to FIG. 2, a block diagram of a publishing device 200 of the event publishing systems 104 is shown in accordance with an illustrative embodiment. Publishing device 200 is an example computing device of the event publishing systems 104. Publishing device 200 may include an input interface 204, an output interface 206, a communication interface 208, a computer-readable medium 210, a processor 212, a keyboard 214, a mouse 216, a display 218, a speaker 220, a printer 222, and an event publishing application 224. Fewer, different, or additional components may be incorporated into publishing device 200.

Input interface 204 provides an interface for receiving information from the user for entry into publishing device 200 as understood by those skilled in the art. Input interface 204 may interface with various input technologies including, but not limited to, keyboard 214, mouse 216, display 218, a track ball, a keypad, one or more buttons, etc. to allow the user to enter information into publishing device 200 or to make selections presented in a user interface displayed on display 218. The same interface may support both input interface 204 and output interface 206. For example, a display comprising a touch screen both allows user input and presents output to the user. Publishing device 200 may have one or more input interfaces that use the same or a different input interface technology. The input interface technology further may be accessible by publishing device 200 through communication interface 208.

Output interface 206 provides an interface for outputting information for review by a user of publishing device 200. For example, output interface 206 may interface with various output technologies including, but not limited to, display 218, speaker 220, printer 222, etc. Publishing device 200 may have one or more output interfaces that use the same or a different interface technology. The output interface technology further may be accessible by publishing device 200 through communication interface 208.

Communication interface 208 provides an interface for receiving and transmitting data between devices using various protocols, transmission technologies, and media as understood by those skilled in the art. Communication interface 208 may support communication using various transmission media that may be wired and/or wireless. Publishing device 200 may have one or more communication interfaces that use the same or a different communication interface technology. For example, publishing device 200 may support communication using an Ethernet port, a Bluetooth antenna, a telephone jack, a USB port, wireless compatible devices, etc. Data and messages may be transferred between publishing device 200 and ESP device 102 and/or the event subscribing systems 106 using communication interface 208.

Computer-readable medium 210 is an electronic holding place or storage for information so the information can be accessed by processor 212 as understood by those skilled in the art. Computer-readable medium 210 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Publishing device 200 may have one or more computer-readable media that use the same or a different memory media technology. Publishing device 200 also may have one or more drives that support the loading of a memory media such as a CD or DVD, an external hard drive, etc. One or more external hard drives further may be connected to publishing device 200 using communication interface 208.

Processor 212 executes instructions as understood by those skilled in the art. The instructions may be carried out by a special purpose computer, logic circuits, or hardware circuits. Processor 212 may be implemented in hardware and/or firmware. Processor 212 executes an instruction, meaning it performs/controls the operations called for by that instruction. The term "execution" can refer to the process of running an application or the carrying out of the operation called for by an instruction. The instructions may be written using one or more programming language, scripting language, assembly language, etc. Processor 212 operably couples with input interface 204, with output interface 206, with communication interface 208, and with computer-readable medium 210 to receive, to send, and to process information. Processor 212 may retrieve a set of instructions from a permanent memory device and copy the instructions in an executable form to a temporary memory device that may be some form of RAM, for example. Publishing device 200 may include a plurality of processors that use the same or a different processing technology.

Event publishing application 224 performs operations associated with creating and publishing data. For illustration, event publishing application 224 may publish data generated by a sensor, data generated or captured in response to occurrence of an event or a transaction, data generated by a device such as in response to an interaction by a user with the device, etc. Some or all of the operations described herein may be embodied in event publishing application 224. The operations may be implemented using hardware, firmware, software, or any combination of these methods. Referring to the example embodiment of FIG. 2, event publishing application 224 is implemented in software (comprised of computer-readable and/or computer-executable instructions) stored in computer-readable medium 210 and accessible by processor 212 for execution of the instructions that embody the operations of event publishing application 224. Event publishing application 224 may be written using one or more programming languages, assembly languages, scripting languages, etc.

Event publishing application 224 may be implemented as a Web application. For example, event publishing application 224 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Figure 3:
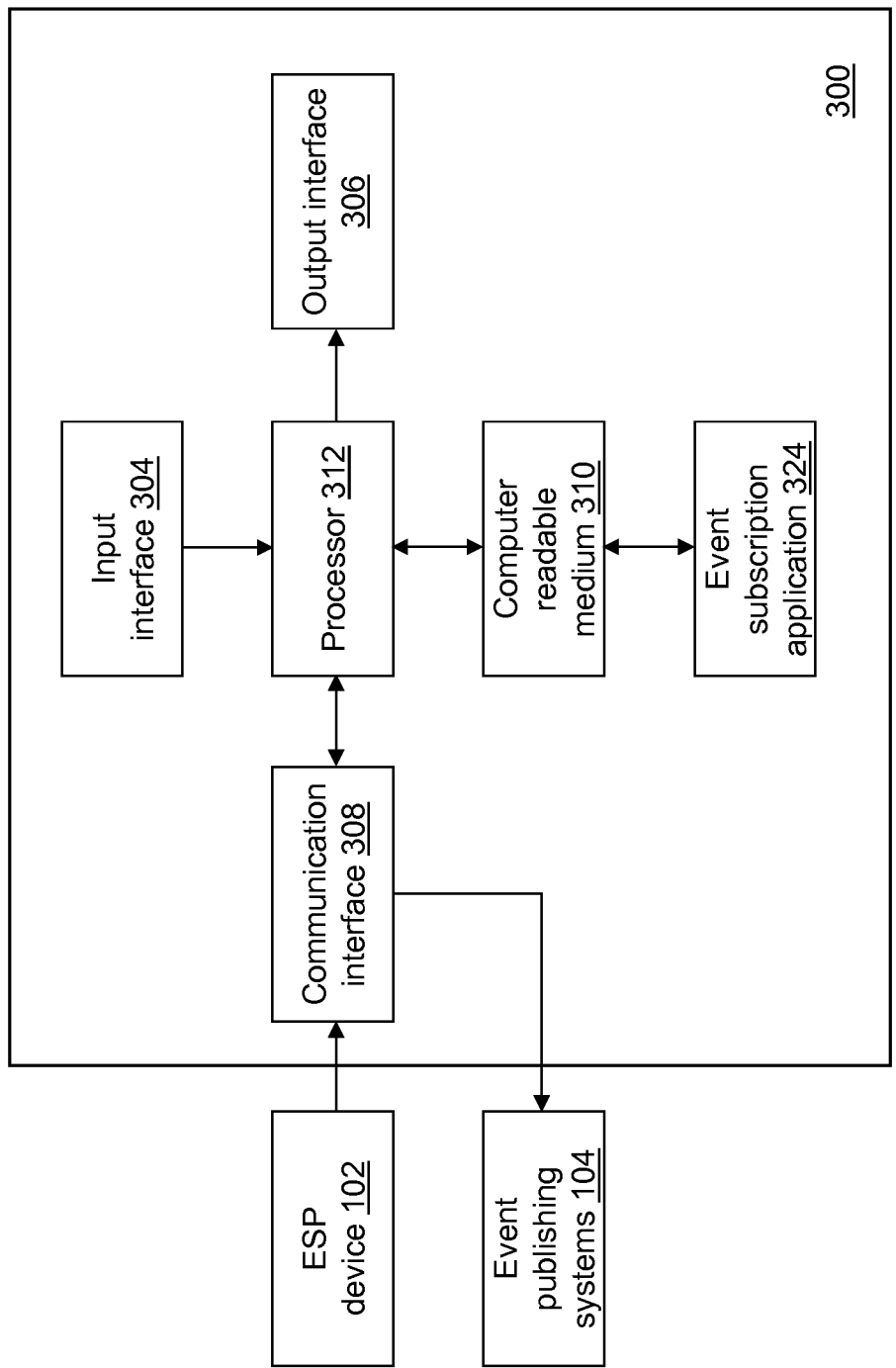
FIG. 3 depicts a block diagram of a subscribing device of event subscribing systems of the ESP system of FIG. 1 in accordance with an illustrative embodiment.

Referring to FIG. 3, a block diagram of a subscribing device 300 of the event subscribing systems 106 is shown in accordance with an example embodiment. Subscribing device 300 is an example computing device of the event subscribing systems 106. Subscribing device 300 may include a second input interface 304, a second output interface 306, a second communication interface 308, a second computer-readable medium 310, a second processor 312, and an event subscription application 324. Fewer, different, or additional components may be incorporated into subscribing device 300.

Second input interface 304 provides the same or similar functionality as that described with reference to input interface 204 of publishing device 200 though referring to subscribing device 300. Second output interface 306 provides the same or similar functionality as that described with reference to output interface 206 of publishing device 200 though referring to subscribing device 300. Second communication interface 308 provides the same or similar functionality as that described with reference to communication interface 208 of publishing device 200 though referring to subscribing device 300. Data and messages may be transferred between subscribing device 300 and ESP device 102 and/or the event publishing systems 104 using second communication interface 308. Second computer-readable medium 310 provides the same or similar functionality as that described with reference to computer-readable medium 210 of publishing device 200 though referring to subscribing device 300. Second processor 312 provides the same or similar functionality as that described with reference to processor 212 of publishing device 200 though referring to subscribing device 300.

Event subscription application 324 performs operations associated with receiving the data published by the one or more computing devices of the event publishing systems 104 and processed by ESP device 102. Some or all of the operations described herein may be embodied in event subscription application 324. The operations may be implemented using hardware, firmware, software, or any combination of these methods. Referring to the example embodiment of FIG. 3, event subscription application 324 is implemented in software (comprised of computer-readable and/or computer-executable instructions) stored in second computer-readable medium 310 and accessible by second processor 312 for execution of the instructions that embody the operations of event subscription application 324. Event subscription application 324 may be written using one or more programming languages, assembly languages, scripting languages, etc. Event subscription application 324 may be implemented as a Web application.

Figure 4:
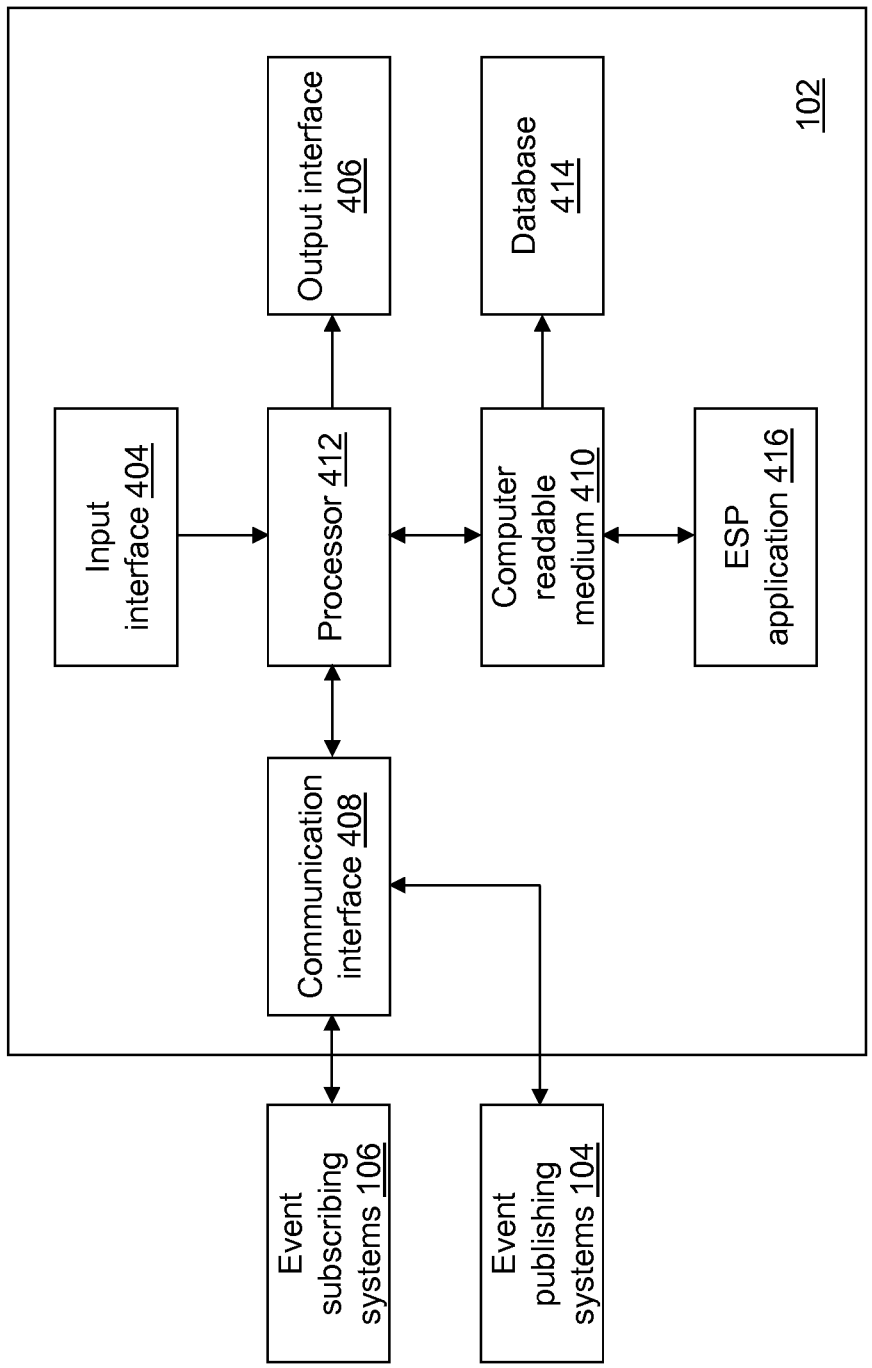
FIG. 4 depicts a block diagram of an ESP device of the ESP system of FIG. 1 in accordance with an illustrative embodiment.

Referring to FIG. 4, a block diagram of ESP device 102 is shown in accordance with an illustrative embodiment. ESP device 102 may include one or more computers of any form factor. ESP device 102 may include a third input interface 404, a third output interface 406, a third communication interface 408, a third computer-readable medium 410, a third processor 412, a database 414, and an ESP application 416. Fewer, different, or additional components may be incorporated into ESP device 102.

Third input interface 404 provides the same or similar functionality as that described with reference to input interface 204 of publishing device 200 though referring to ESP device 102. Third output interface 406 provides the same or similar functionality as that described with reference to output interface 206 of publishing device 200 though referring to ESP device 102. Third communication interface 408 provides the same or similar functionality as that described with reference to communication interface 208 of publishing device 200 though referring to ESP device 102. Data and messages may be transferred between ESP device 102 and the event subscribing systems 106 and/or the event publishing systems 104 using third communication interface 408. Third computer-readable medium 410 provides the same or similar functionality as that described with reference to computer-readable medium 210 of publishing device 200 though referring to ESP device 102. Third processor 412 provides the same or similar functionality as that described with reference to processor 212 of publishing device 200 though referring to ESP device 102.

ESP device 102 includes or can access database 414 either through a direct connection or through network 108 using third communication interface 408. Third computer-readable medium 410 may provide the electronic storage medium for database 414. Database 414 is a data repository for ESP system 100. The data stored in database 414 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Database 414 may be implemented using various formats as known to those skilled in the art including a file system, a relational database, a system of tables, a structured query language database, etc. For example, database 414 may be stored in a cube distributed across a grid of computers as understood by a person of skill in the art. As another example, database 414 may be stored in a multi-node Hadoop® cluster, as understood by a person of skill in the art. Apache™ Hadoop®, for example, is an open-source software framework for distributed computing supported by the Apache Software Foundation. As another example, database 414 may be stored in a cloud of computers and accessed using cloud computing technologies, as understood by a person of skill in the art. The SAS® LASR™ Analytic Server, for example, developed and provided by SAS Institute Inc. of Cary, N.C., USA may be used as an analytic platform to enable multiple users to concurrently access data stored in database 414. Other servers and systems may be used.

ESP application 416 performs operations associated with processing data created by the one or more computing devices of the event publishing systems 104 and sending the processed data to the one or more computing devices of the event subscribing systems 106 based on the subscription request of each computing device of the event subscribing systems 106. ESP application 416 may embed an ESP engine (ESPE) with its own dedicated thread pool or pools into its application space where the main application thread can do application-specific work and the ESPE processes event streams at least by creating an instance of a model into processing objects. Some or all of the operations described herein may be embodied in ESP application 416. The operations may be implemented using hardware, firmware, software, or any combination of these methods. Referring to the example embodiment of FIG. 4, ESP application 416 is implemented in software (comprised of computer-readable and/or computer-executable instructions) stored in third computer-readable medium 410 and accessible by third processor 412 for execution of the instructions that embody the operations of ESP application 416. ESP application 416 may be written using one or more programming languages, assembly languages, scripting languages, etc. ESP application 416 may be implemented as a Web application, for example.

Event subscription application 324, event publishing application 224, and ESP application 416 may save or store data to database 414 and access or retrieve data from database 414. Event subscription application 324, event publishing application 224, and ESP application 416 may be the same or different applications or part of an integrated, distributed application supporting some or all of the same or additional types of functionality as described herein. As an example, the functionality provided by ESP application 416 may be provided as part of the DataFlux ESP Engine developed and provided by SAS Institute Inc. of Cary, N.C., USA and/or ESP applications offered by other software vendors. Various levels of integration between the components of ESP system 100 may be implemented without limitation as understood by a person of skill in the art. For example, all of the functionality described for ESP system 100 may be implemented in a single computing device.

Figure 5:
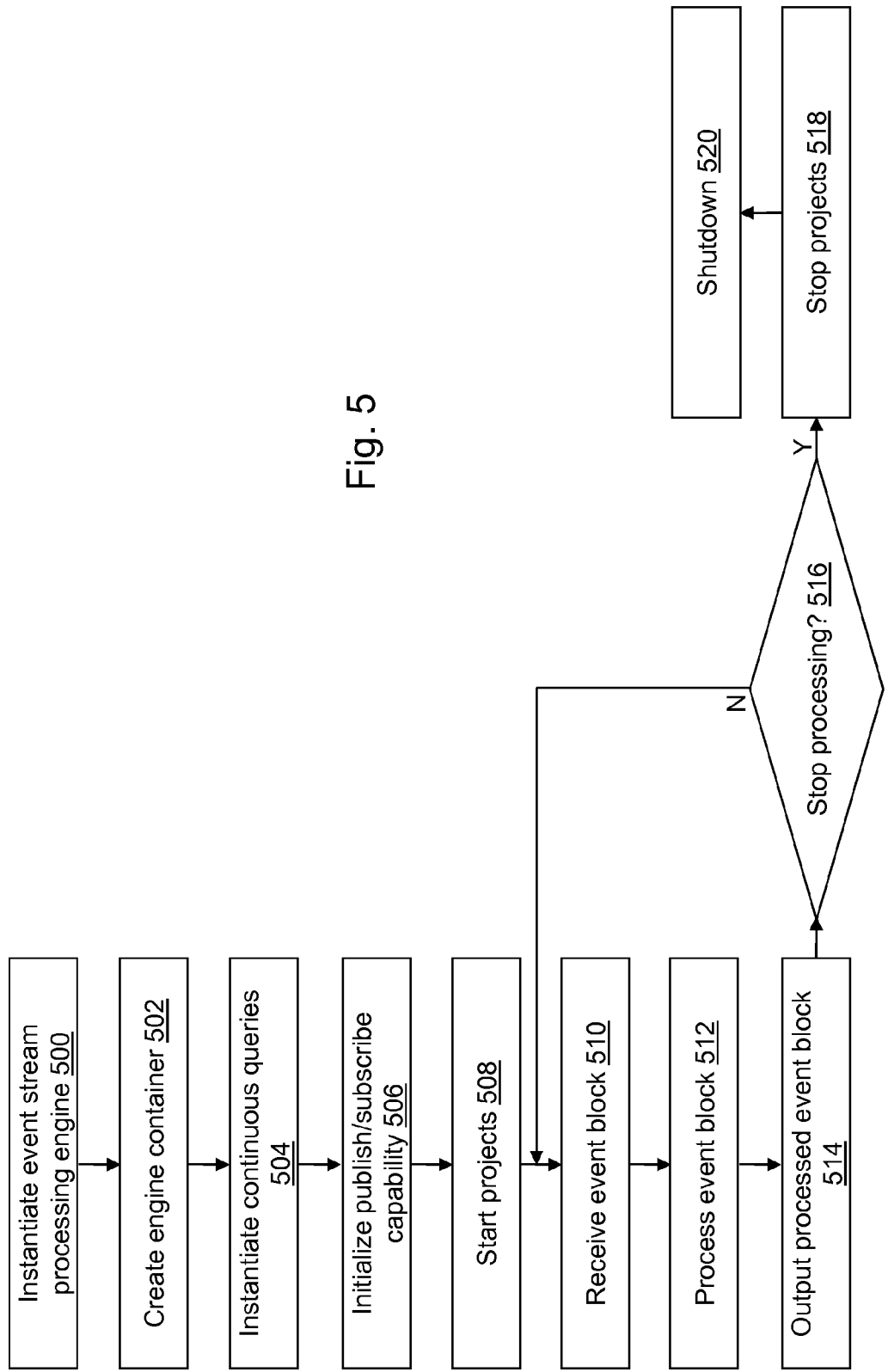
FIG. 5 depicts a flow diagram illustrating examples of operations performed by the ESP device of FIG. 4 in accordance with an illustrative embodiment.

Referring to FIG. 5, example operations associated with ESP application 416 are described. ESP application 416 defines how input event streams from publishers are transformed into meaningful output event streams consumed by subscribers. Additional, fewer, or different operations may be performed depending on the embodiment. The order of presentation of the operations of FIG. 5 is not intended to be limiting. A user can interact with one or more user interface windows presented to the user in a display such as display 218 under control of ESP application 416 independently or through a browser application in an order selectable by the user. Although some of the operational flows are presented in sequence, the various operations may be performed in various repetitions, concurrently, and/or in other orders than those that are illustrated. For example, a user may execute ESP application 416, which causes presentation of a first user interface window, which may include a plurality of menus and selectors such as drop down menus, buttons, text boxes, hyperlinks, etc. associated with ESP application 416 as understood by a person of skill in the art. As further understood by a person of skill in the art, various operations may be performed in parallel, for example, using a plurality of threads.

Figure 6:
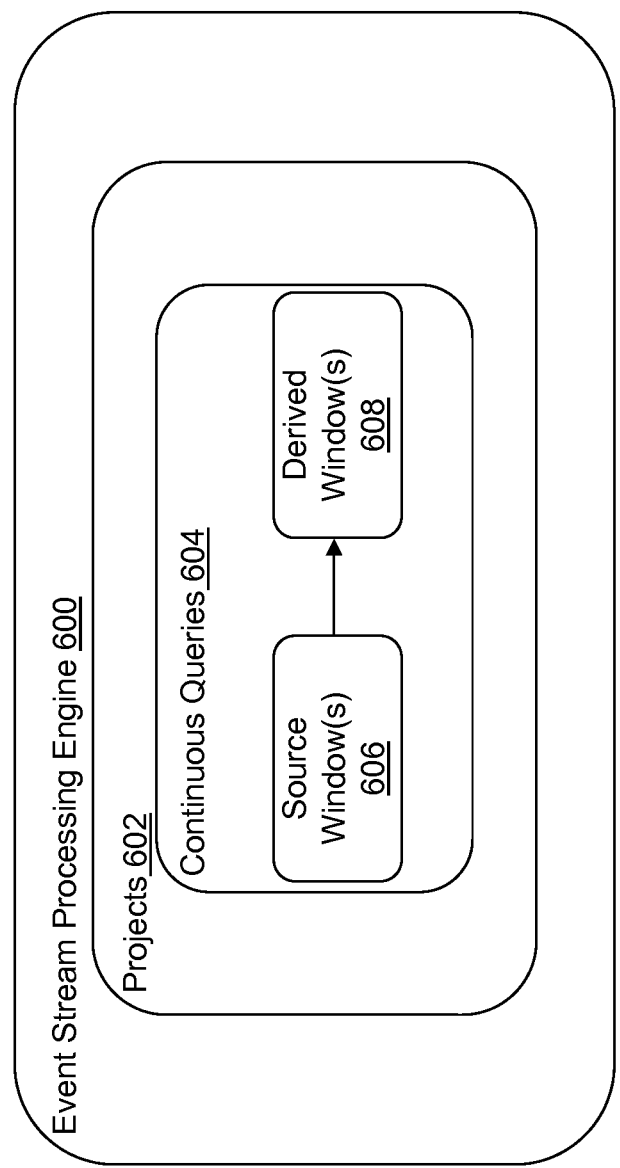
FIG. 6 depicts a block diagram of an ESP engine executing at the ESP device of FIG. 4 in accordance with an illustrative embodiment.

In an operation 500, ESP application 416 defines and starts an ESP engine (ESPE) thereby instantiating an ESPE at ESP device 102. For example, referring to FIG. 6, the components of an ESPE 600 executing at ESP device 102 are shown in accordance with an illustrative embodiment. ESPE 600 may include one or more projects 602. A project may be described as a second-level container in an engine model managed by ESPE 600 where a thread pool size for the project may be defined by a user. A value of 1 for the thread pool size indicates that writes are single-threaded. Each project of the one or more projects 602 may include one or more continuous queries 604 that contain data flows, which are data transformations of incoming event streams. The one or more continuous queries 604 may include one or more source windows 606 and one or more derived windows 608.

The engine container is the top-level container in a model that manages the resources of the one or more projects 602. In an illustrative embodiment, for example, there can be only one ESPE 600 for each instance of ESP application 416, and ESPE 600 has a unique engine name. Additionally, the one or more projects 602 may each have unique project names, and each query may have a unique continuous query name and begin with a uniquely named source window of the one or more source windows 606. ESPE 600 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 606 and the one or more derived windows 608 represent continuously executing queries that generate updates to a query result set as new event blocks stream through ESPE 600. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 600 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 604 transforms a source event stream made up of streaming event block objects published into ESPE 600 into one or more output event streams using the one or more source windows 606 and the one or more derived windows 608. A continuous query can also be thought of as data flow modeling.

The one or more source windows 606 are at the top of the directed graph and have no windows feeding into them. Event streams are published into the one or more source windows 606, and from there, the event streams are directed to the next set of connected windows as defined by the directed graph. The one or more derived windows 608 are all instantiated windows that are not source windows and that have other windows streaming events into them. The one or more derived windows 608 perform computations or transformations on the incoming event streams. The one or more derived windows 608 transform event streams based on the window type (that is operators such as join, filter, compute, aggregate, copy, pattern match, procedural, union, etc.) and window settings. As event streams are published into ESPE 600, they are continuously queried, and the resulting sets of derived windows in these queries are continuously updated.

ESP application 416 may be developed, for example, using a modeling application programming interface (API) that provides a set of classes with member functions. As an example, the SAS ESP Engine developed and provided by SAS Institute Inc. of Cary, N.C., USA provides a modeling API that provides a set of classes with member functions. These functions enable ESP application 416 to embed ESPE 600 possibly with dedicated thread pools into its own process space. Alternatively, ESPE 600 can be embedded into the process space of an existing or a new application. In that case, a main application thread is focused on its own chores and interacts with the embedded ESPE 600 as needed.

Referring to FIG. 5, in an operation 502, the engine container is created. For illustration, ESPE 600 may be instantiated using a function call that specifies the engine container as a manager for the model. The function call may include the engine name for ESPE 600 that is provided by a user or a developer and may be unique to ESPE 600.

In an operation 504, the one or more continuous queries 604 are instantiated by ESPE 600 as a model. The one or more continuous queries 604 may be instantiated with a dedicated thread pool or pools that generate updates as new events stream through ESPE 600. For illustration, the one or more continuous queries 604 may be created to model business processing logic within ESPE 600, to predict events within ESPE 600, to model a physical system within ESPE 600, to predict the physical system state within ESPE 600, etc. For example, ESPE 600 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.), capital markets trading systems, fraud detection and prevention, personalized marketing, operational systems monitoring and management, cyber security analytics, etc.

To create a continuous query, input event structures that are schemas with keys that flow into the one or more source windows 606 may be identified. Output event structures that are also schemas with keys generated by the one or more source windows 606 and/or the one or more derived windows 608 may also be identified. For example, the block of code below illustrates creation of a compute window that normalizes a "City" field that is created for events in that window:

and the one or more derived windows 608 may be created based on the relational, pattern matching, and procedural algorithms that transform the input event streams into the output event streams to model, simulate, score, test, predict, etc. based on the continuous query model defined and application to the streamed data.

In an operation 506, a publish/subscribe (pub/sub) capability is initialized for ESPE 600. In an illustrative embodiment, a pub/sub capability is initialized for each project of the one or more projects 602. To initialize and enable pub/sub capability for ESPE 600, a port number is provided. Pub/sub clients can use a host name of ESP device 102 and the port number to establish pub/sub connections to ESPE 600. For example, a server listener socket is opened for the port number to enable of event publishing systems 104 and event subscribing systems 106 to connect to ESPE 600 for publish/subscribe services. The host name of ESP device 102 and the port number to establish pub/sub connections to ESPE 600 may be referred to as the host:port designation of ESPE 600 executing at ESP device 102.

Figure 7:
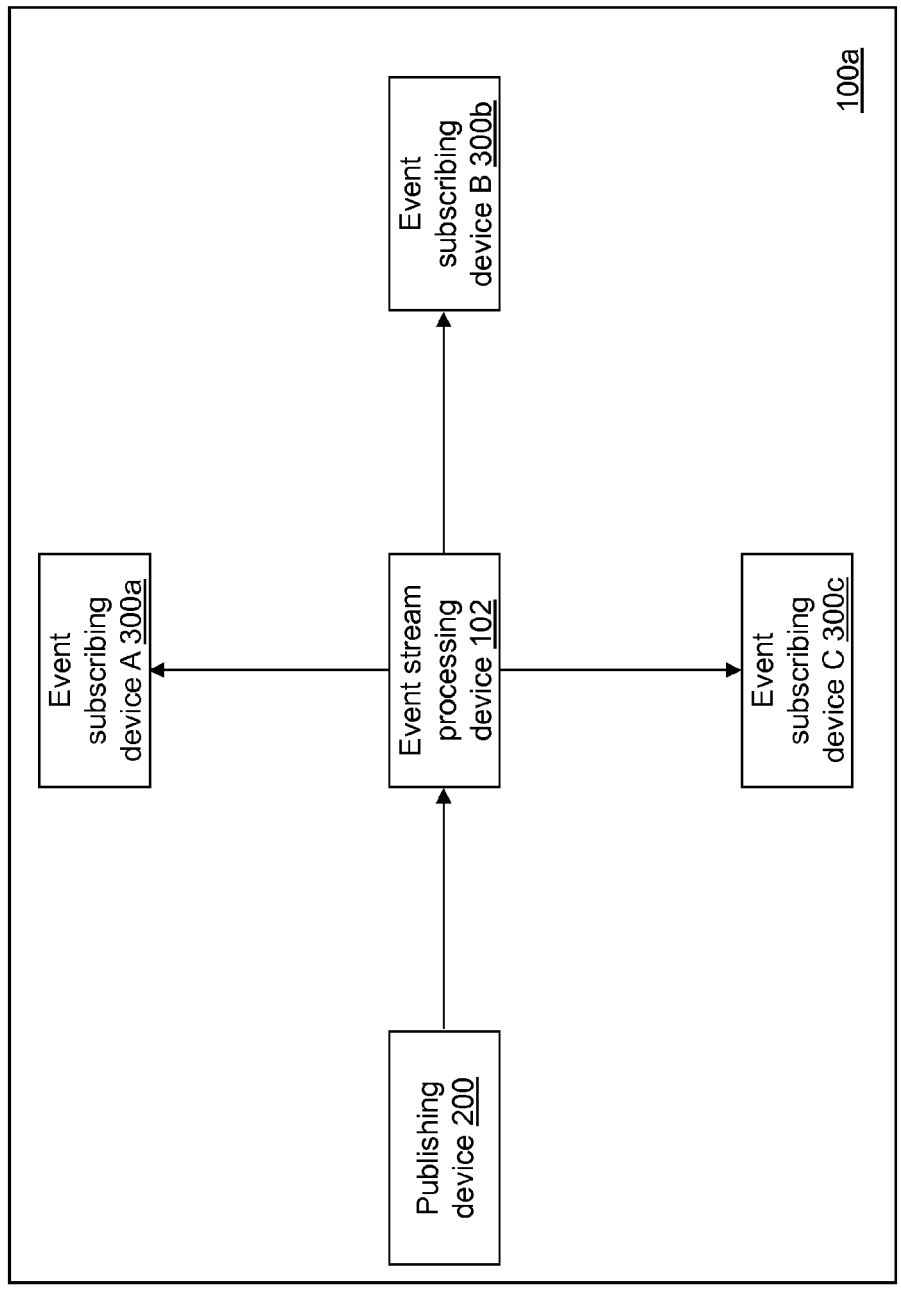
FIG. 7 depicts a block diagram illustrating interactions among the components of the ESP system of FIG. 1 in accordance with an illustrative embodiment.

Referring to FIG. 7, a first ESP system 100a may include ESP device 102, publishing device 200, an event subscribing device A 300a, an event subscribing device B 300b, and an

```
    dfESPwindow_source *sw;
    sw = contQuery->newWindow_source("sourceWindow", depot,
        dfESPindextypes::pi_HASH,
        dfESPstring("name:string,ID*:int32,city:string"));
    dfESPschema *sw_schema = sw->getSchema( );
    dfESPwindow_compute *cw;
    cw = contQuery->newWindow_compute("computeWindow", depot,
        dfESPindextypes::pi_HASH,
        dfESPstring("ID*:int32,name:string,oldCity:string,newCity:string"));
// Register the non-key field calculation expressions.
    cw->addNonKeyFieldCalc("name"); // pass name through unchanged
    cw->addNonKeyFieldCalc("city"); // pass city through unchanged
// Run city through the blue fusion standardize function.
    char newCity[1024] = "bluefusion bf\r\n";
    strcat(newCity, "String result\r\n");
    strcat(newCity, "bf = bluefusion_initialize( )\r\n");
    strcat(newCity, "if (isnull(bf)) then\r\n");
    strcat(newCity, " print(bf.getlasterror( ))\r\n");
    strcat(newCity, "if (bf.loadqkb(\"ENUSA\") == 0) then\r\n");
    strcat(newCity, " print(bf.getlasterror( ))\r\n");
    strcat(newCity, "if (bf.standardize(\"City\",city,result) == 0) then\r\n");
    strcat(newCity, " print(bf.getlasterror( ))\r\n");
    strcat(newCity, "return result");
    cw->addNonKeyFieldCalc(newCity);
// Add the subscriber callbacks to the windows
    cw->addSubscriberCallback(winSubscribe_compute);
// Add window connectivity
    contQuery->addEdge(sw, 0, cw);
// create and start the project
    project->setNumThreads(2);
    myEngine->startProjects( );
// declare variables to build up the input data.
    dfESPptrVect<dfESPeventPtr> trans;
    dfESPevent *p;
// Insert multiple events
    p = new dfESPevent(sw_schema,(char *)"i,n,Jerry, 1111, apex");
    trans.push_back(p);
    p = new dfESPevent(sw_schema,(char *)"i,n,Scott, 1112, caryy");
    trans.push_back(p);
    p = new dfESPevent(sw_schema,(char *)"i,n,someone, 1113, rallleigh");
    trans.push_back(p);
    dfESPeventblockPtr ib = dfESPeventblock::newEventBlock(&trans,
        dfESPeventblock::ebt_TRANS);
    project->injectData(contQuery, sw, ib);
```

ESPE 600 may analyze and process events in motion or "event streams." Instead of storing data and running queries against the stored data, ESPE 600 may store queries and stream data through them to allow continuous analysis of data as it is received. The one or more source windows 606 event subscribing device C 300c. Input event streams are output to ESP device 102 by publishing device 200. In alternative embodiments, the input event streams may be created by a plurality of publishing devices of event publishing systems 104. The plurality of publishing devices of event publishing systems 104 further may publish event streams to another ESP device 102. The one or more continuous queries 604 instantiated by ESPE 600 analyze and process the input event streams to form output event streams output to event subscribing device A 300a, event subscribing device B 300b, and event subscribing device C 300c. First ESP system 100a may include a greater or a fewer number of event subscribing devices of event subscribing systems 106.

Publish-subscribe is a message-oriented interaction paradigm based on indirect addressing. Processed data recipients specify their interest in receiving information from ESPE 600 by subscribing to specific classes of events, while information sources publish events to ESPE 600 without directly addressing the receiving parties. ESPE 600 coordinates the interactions and processes the data. In some cases, the data source receives confirmation that the published information has been received by a data recipient.

A publish/subscribe API may be described as a library that enables an event publisher, such as publishing device 200, to publish event streams into ESPE 600 or an event subscriber, such as event subscribing device A 300a, event subscribing device B 300b, and event subscribing device C 300c, to subscribe to event streams from ESPE 600. For illustration, one or more publish/subscribe APIs may be defined. As an example, a version of the SAS ESP Engine offered by SAS Institute Inc. can provide a C++ publish/subscribe API and a Java publish/subscribe API. Using the publish/subscribe API, event publishing application 224 may publish event streams into a running event stream processor project source window of ESPE 600, and event subscription application 324 may subscribe to an event stream processor project source window of ESPE 600.

The publish/subscribe API provides cross-platform connectivity and endianness compatibility between ESP application 416 and other networked applications, such as event publishing application 224 instantiated at publishing device 200, and event subscription application 324 instantiated at one or more of event subscribing device A 300a, event subscribing device B 300b, and event subscribing device C 300c.

Referring to FIG. 5, operation 506 initializes the publish/subscribe capability of ESPE 600. In an operation 508, the one or more projects 602 are started. The one or more started projects may run in the background on ESP device 102.

Figure 8:
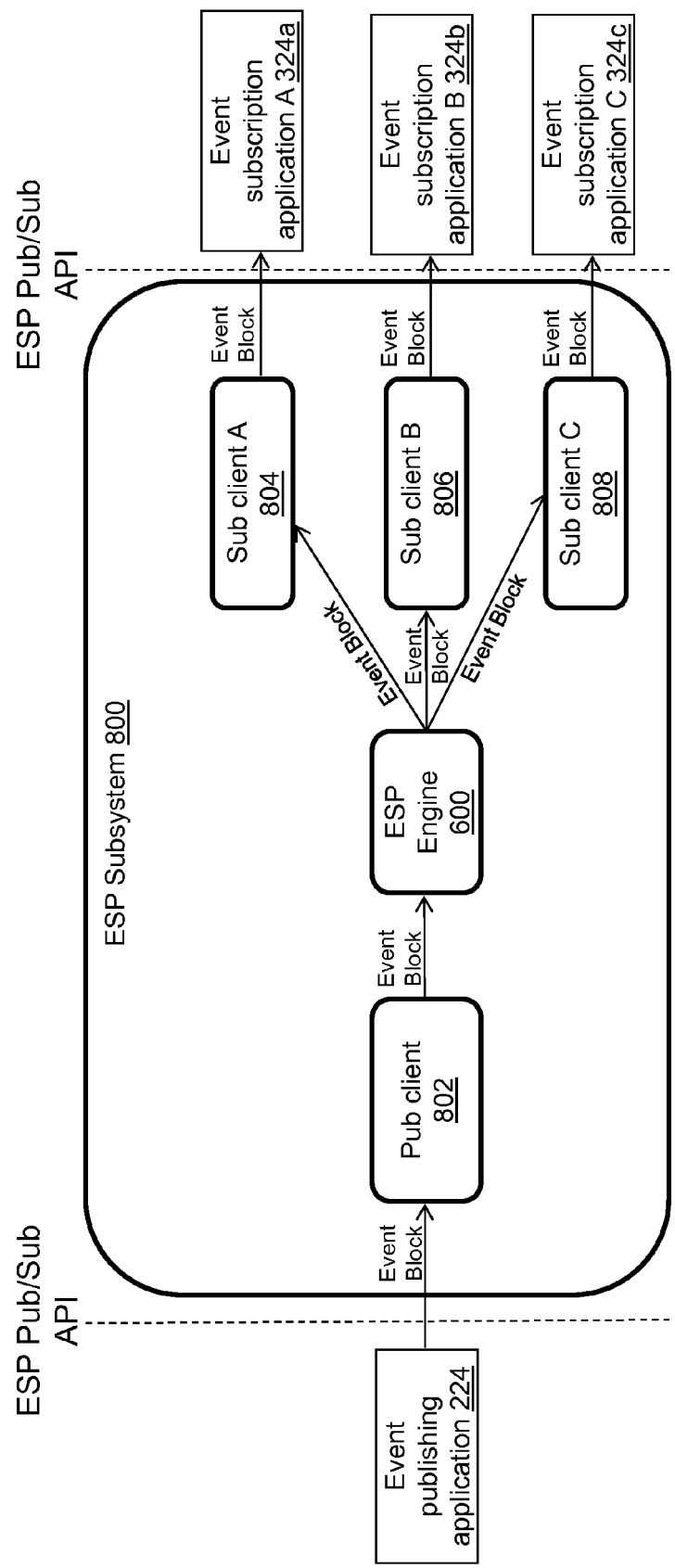
FIG. 8 depicts a second block diagram illustrating interactions among the components of the ESP system of FIG. 1 in accordance with an illustrative embodiment.

In an operation 510, an event block object is received from one or more computing device of the event publishing systems 104, for example, from publishing device 200. For illustration, referring to FIG. 8, an ESP subsystem 800 is shown interfacing between publishing device 200 and event subscribing device A 300a, event subscribing device B 300b, and event subscribing device C 300c in accordance with an illustrative embodiment. ESP subsystem 800 may or may not be persistent. In the illustrative embodiment, ESP subsystem 800 includes a publishing client 802, ESPE 600, a subscribing client A 804, a subscribing client B 806, and a subscribing client C 808. Publishing client 802 is started by event publishing application 224 executing at publishing device 200 using the publish/subscribe API. Subscribing client A 804 is started by an event subscription application A 324a executing at event subscribing device A 300a using the publish/subscribe API. Subscribing client B 806 is started by an event subscription application B 324b executing at event subscribing device B 300b using the publish/subscribe API. Subscribing client C 808 is started by an event subscription application C 324c executing at event subscribing device C 300c using the publish/subscribe API.

An event block object containing one or more event objects is injected into a source window of the one or more source windows 606 from an instance of event publishing application 224. The event block object is generated, for example, by event publishing application 224 and is received by publishing client 802. A unique ID is maintained as the event block object is passed between the one or more source windows 606 and/or the one or more derived windows 608 of ESPE 600, and to subscribing client A 804, subscribing client B 806, and subscribing client C 808 and to event subscription application A 324a, event subscription application B 324b, and event subscription application C 324c. Publishing client 802 may further generate and include a unique embedded transaction ID in the event block object as the event block object is processed by a continuous query, as well as the unique ID that publishing device 200 assigned to the event block object.

In an operation 512, the event block object is processed through the one or more continuous queries 604. In an operation 514, the processed event block object is output to one or more computing devices of the event subscribing systems 106. For example, subscribing client A 804, subscribing client B 806, and subscribing client C 808 send the received event block object to event subscription application A 324a, event subscription application B 324b, and event subscription application C 324c, respectively.

ESPE 600 maintains the event block containership aspect of the received event blocks from when the event block is published into a source window and works its way through the directed graph defined by the one or more continuous queries 604 with the various event translations before being output to subscribers. Subscribers can correlate a group of subscribed events back to a group of published events by comparing the unique ID of the event block object that a publisher, such as publishing device 200, attached to the event block object with the event block ID received by the subscriber.

In an operation 516, a determination is made concerning whether or not processing is stopped. If processing is not stopped, processing continues in operation 510 to continue receiving the one or more event streams containing event block objects from the one or more computing devices of the event publishing systems 104. If processing is stopped, processing continues in an operation 518. In operation 518, the started projects are stopped. In operation 520, ESPE 600 is shutdown.

Figure 9:
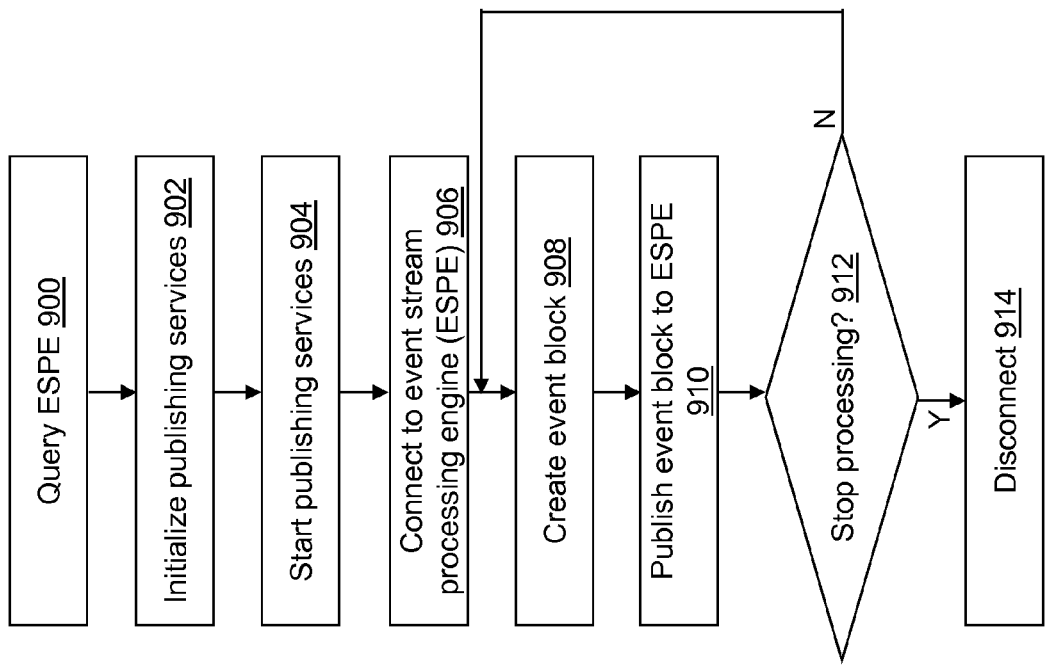
FIG. 9 depicts flow diagrams illustrating examples of operations performed by the publishing device of FIG. 2 in accordance with an illustrative embodiment.

Referring to FIG. 9, example operations associated with event publishing application 224 are described. Additional, fewer, or different operations may be performed depending on the embodiment. The order of presentation of the operations of FIG. 9 is not intended to be limiting.

In an operation 900, ESPE 600 is queried, for example, to discover projects 602, continuous queries 604, windows 606,608, window schema, and window edges currently running in ESPE 600. The engine name and host/port to ESPE 600 may be provided as an input to the query and a list of strings may be returned with the names to the projects 602, to the continuous queries 604, to the windows 606,608, to the window schema, and/or to the window edges of currently running projects on ESPE 600. The host is associated with a host name or Internet Protocol (IP) address of ESP device 102. The port is the port number provided when the pub/sub capability is initialized by ESPE 600. The engine name is the name of ESPE 600. The engine name of ESPE 600 and host/port to ESP device 102 may be read from a storage location on computer-readable medium 210, may be provided on a command line, or otherwise input to or defined by event publishing application 224 as understood by a person of skill in the art.

In an operation 902, publishing services are initialized. In an operation 904, the initialized publishing services are started, which may create a publishing client, such as publishing client 802, for the instantiated event publishing application 224. The publishing client, such as publishing client 802, performs the various pub/sub activities for the instantiated event publishing application 224. For example, a string representation of a URL to ESPE 600 is passed to a "Start" function. For example, the URL may include the host:port designation of ESPE 600 executing at ESP device 102, a project of the projects 602, a continuous query of the continuous queries 604, and a window of the source windows 606. The "Start" function may validate and retain the connection parameters for a specific publishing client connection and return a pointer to the publishing client. For illustration, the URL may be formatted as "dfESP://<host>:<port>/<project name>/<continuous query name>/<window name>". If event publishing application 224 is publishing to more than one source window of ESPE 600, the initialized publishing services may be started to each source window using the associated names (project name, continuous query name, window name).

In an operation 906, a connection is made between event publishing application 224 and ESPE 600 for each source window to which data is published. To make the connection, the pointer to the created publishing client may be passed to a "Connect" function and a mostly non-busy wait loop created to wait for receipt of event block objects from event publishing application 224. If event publishing application 224 is publishing to more than one source window of ESPE 600, a connection may be made to each started window using the pointer returned for the respective "Start" function call.

In an operation 908, an event block object is created by event publishing application 224. In an operation 910, the created event block is published to ESPE 600 using the pointer returned for the respective "Start" function call to the appropriate source window. Event publishing application 224 passes the created event block to publishing client 802, where the unique ID field in the event block object has been set by event publishing application 224 possibly after being requested from publishing client 802. In an illustrative embodiment, event publishing application 224 may wait to begin publishing until a "Ready" callback has been received from publishing client 802. The event block object is injected into the source window, continuous query, and project associated with the started publishing client.

In an operation 912, a determination is made concerning whether or not processing is stopped. If processing is not stopped, processing continues in operation 908 to continue creating and publishing event block objects. If processing is stopped, processing continues in an operation 914. In operation 914, the connection made between event publishing application 224 and ESPE 600 through the publishing client is disconnected, and each started publishing client is stopped.

Figure 10:
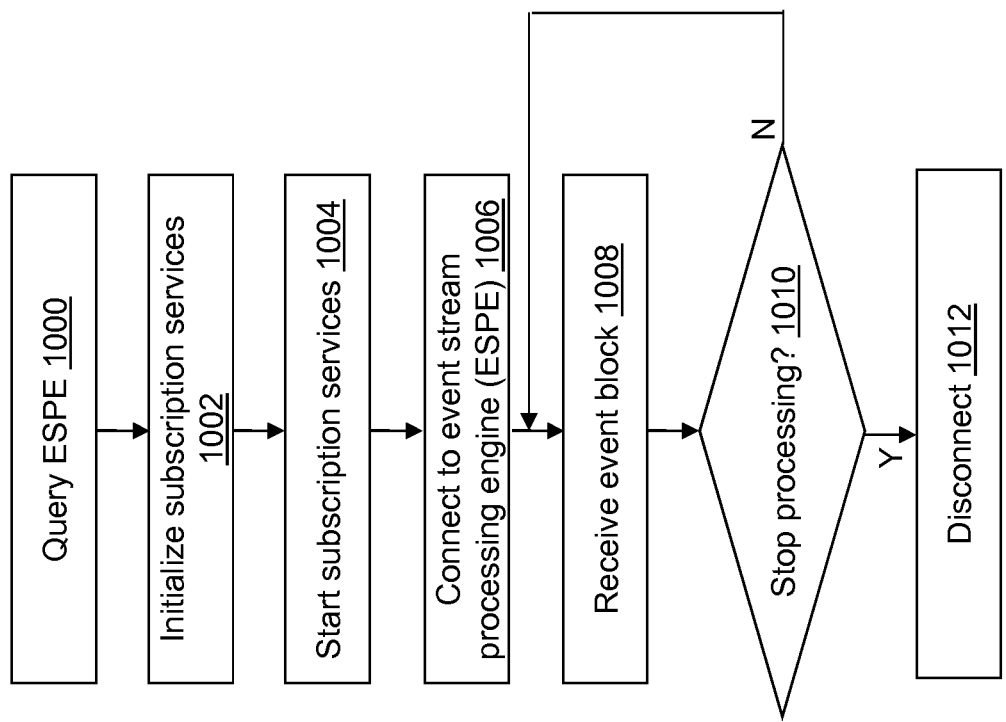
FIG. 10 depicts flow diagrams illustrating examples of operations performed by the subscribing device of FIG. 3 in accordance with an illustrative embodiment.

Referring to FIG. 10, example operations associated with event subscription application 324 are described. Additional, fewer, or different operations may be performed depending on the embodiment. The order of presentation of the operations of FIG. 10 is not intended to be limiting.

Similar to operation 900, in an operation 1000, ESPE 600 is queried, for example, to discover names of projects 602, of continuous queries 604, of windows 606,608, of window schema, and of window edges currently running in ESPE 600. The host name of ESP device 102, the engine name of ESPE 600, and the port number opened by ESPE 600 are provided as an input to the query and a list of strings may be returned with the names to the projects 602, continuous queries 604, windows 606,608, window schema, and/or window edges.

In an operation 1002, subscription services are initialized. In an operation 1004, the initialized subscription services are started, which may create a subscribing client, such as subscribing client A 804, on behalf of event subscription application 324 at subscribing device 300. The subscribing client, such as subscribing client A 804, performs the various pub/sub activities for event subscription application 324. For example, a URL to ESPE 600 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1006, a connection is made between event subscription application 324 and ESPE 600 through the created subscribing client. To make the connection, the pointer to the created subscribing client may be passed to a "Connect" function and a mostly non-busy wait loop created to wait for receipt of event block objects.

In an operation 1008, an event block object is received by event subscription application 324.

In an operation 1010, a determination is made concerning whether or not processing is stopped. If processing is not stopped, processing continues in operation 1008 to continue receiving event block objects. If processing is stopped, processing continues in an operation 1012. In operation 1012, the connection made between event subscription application 324 and ESPE 600 through the subscribing client is disconnected, and the subscribing client is stopped.

Figure 11:
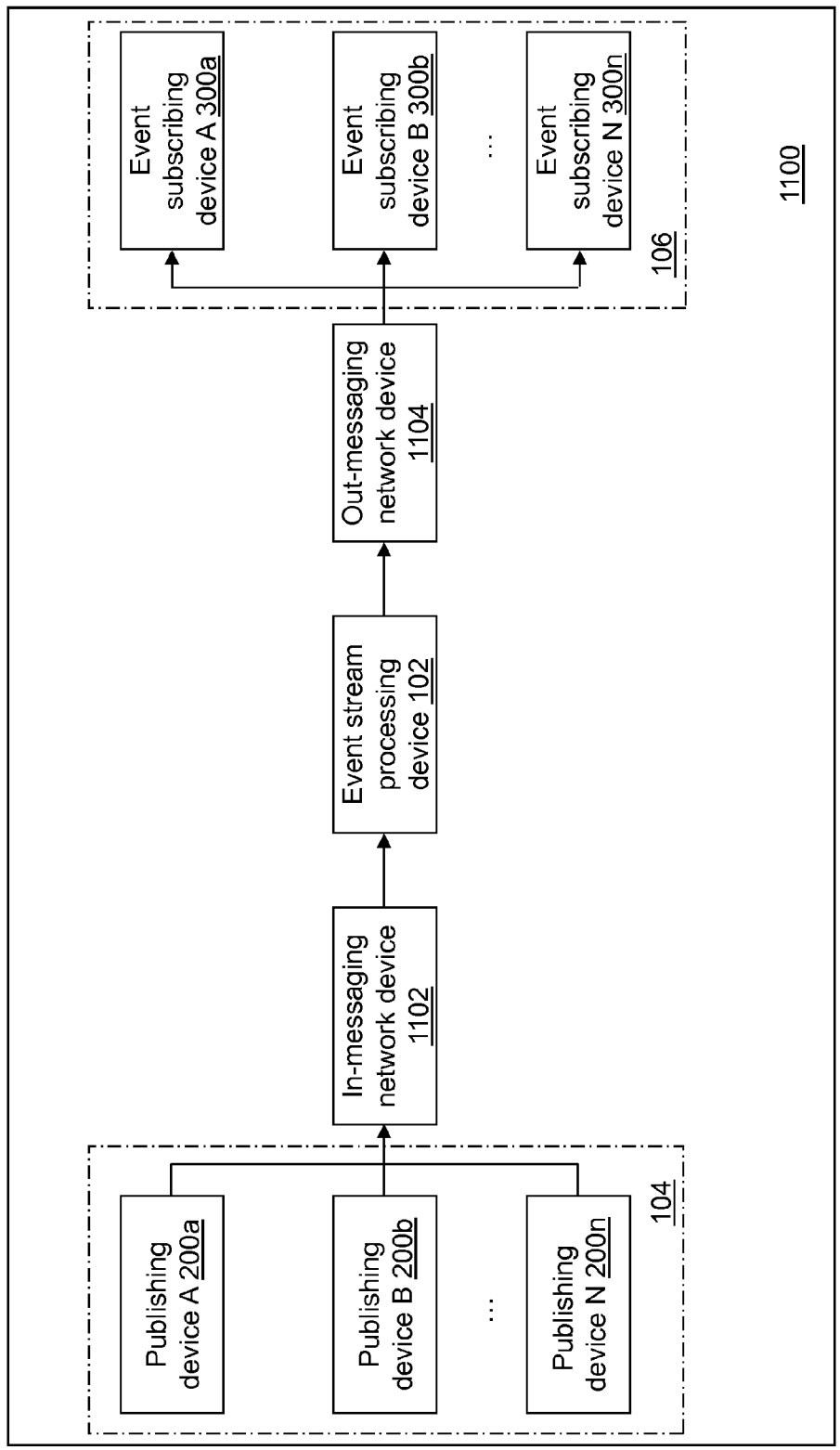
FIG. 11 depicts a block diagram illustrating interactions among the components of a second ESP system of FIG. 1 in accordance with an illustrative embodiment.

Referring to FIG. 11, a second ESP system 1100 is shown in accordance with an illustrative embodiment. Second ESP system 1100 may include ESP device 102, event publishing systems 104, event subscribing systems 106, an in-messaging network device 1102, and an out-messaging network device 1104. For illustration, event publishing systems 104 may include a publishing device A 200a, a publishing device B 200b, . . . , and a publishing device N 200n. Event publishing systems 104 publish data to ESP device 102 through in-messaging network device 1102. In-messaging network device 1102 receives events published by event publishing systems 104 and injects the received events into the appropriate source window of ESPE 600.

For illustration, event subscribing systems 106 may include event subscribing device A 300a, event subscribing device B 300b, . . . , and an event subscribing device N 300n. The event subscribing systems 106 subscribe to and receive the published data through out-messaging network device 1104 after processing by ESPE 600. Out-messaging network device 1104 receives events from ESPE 600 and publishes the events to event subscribing systems 106. In-messaging network device 1102 and out-messaging network device 1104 may be implemented in the same or different devices as understood by a person of skill in the art. Though not shown, network 108 may be used to support communication between one or more components of second ESP system 1100.

In-messaging network device 1102 and out-messaging network device 1104 provide a message network. For example, the message network may be implemented as a data fabric configured to support a large volume of possibly time-sensitive and dynamic message flows. Example products and vendors of in-messaging network device 1102 and out-messaging network device 1104 may include the Tervela© Message Switch™ (TMX), the Tervela Provisioning and Management (TPM) system, and the Tervela Persistence Engine (TPE) offered by Tervela Inc. of New York, N.Y., USA, Solace Message Routers offered by Solace Systems of Ottawa, Ontario, CA, and RabbitMQ™ offered by Pivotal Software, Inc. of London, UK.

In-messaging network device 1102 routes messages from event publishing application 224 executing at event publishing systems 104 to ESPE 600 executing at ESP device 102. Out-messaging network device 1104 routes messages from ESPE 600 executing at ESP device 102 to event subscription application 324 executing at event subscribing systems 106. In-messaging network device 1102 and out-messaging network device 1104 further may store information and message traffic within the respective message network.

Figure 12:
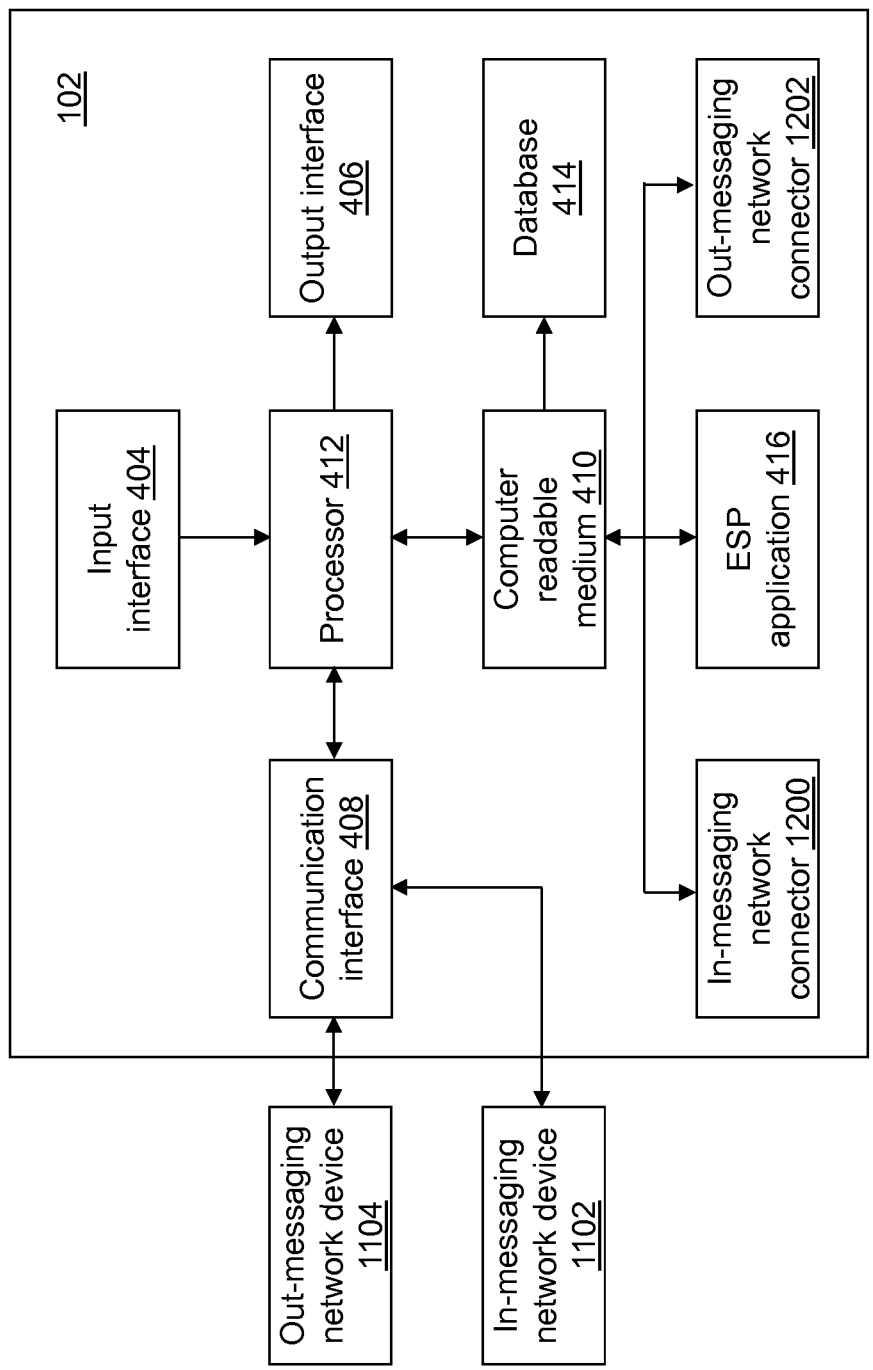
FIG. 12 depicts a block diagram of a second ESP device of the second ESP system of FIG. 11 in accordance with an illustrative embodiment.

Referring to FIG. 12, ESP device 102 further may include an in-messaging network connector 1200 and an out-messaging network connector 1202 in accordance with an illustrative embodiment. In-messaging network connector 1200 performs operations associated with connecting to in-messaging network device 1102, receiving an event block object from in-messaging network device 1102, and publishing the received event block object to a source window of the source windows 606 of ESPE 600. The operations may be implemented using hardware, firmware, software, or any combination of these methods. Referring to the example embodiment of FIG. 12, in-messaging network connector 1200 is implemented in software (involving computer-readable and/or computer-executable instructions) stored in third computer-readable medium 410 and accessible by third processor 412 for execution of the instructions that embody the operations of in-messaging network connector 1200.

ESP application 416 and in-messaging network connector 1200 may be integrated in various manners as understood by a person of skill in the art. In-messaging network connector 1200 may be written using one or more programming languages, assembly languages, scripting languages, etc. For illustration, in-messaging network connector 1200 may be implemented as a plug-in that is an in-process class of ESP application 416.

Out-messaging network connector 1202 performs operations associated with connecting to out-messaging network device 1104, receiving an event block object from ESPE 600 after processing by ESPE 600, and publishing the received event block object to out-messaging network device 1104. The operations may be implemented using hardware, firmware, software, or any combination of these methods. Referring to the example embodiment of FIG. 12, out-messaging network connector 1202 is implemented in software (involving computer-readable and/or computer-executable instructions) stored in third computer-readable medium 410 and accessible by third processor 412 for execution of the instructions that embody the operations of out-messaging network connector 1202.

ESP application 416 and out-messaging network connector 1202 may be integrated in various manners as understood by a person of skill in the art. Out-messaging network connector 1202 may be written using one or more programming languages, assembly languages, scripting languages, etc. For illustration, out-messaging network connector 1202 may be implemented as a plug-in that is an in-process class of ESP application 416.

Figure 13:
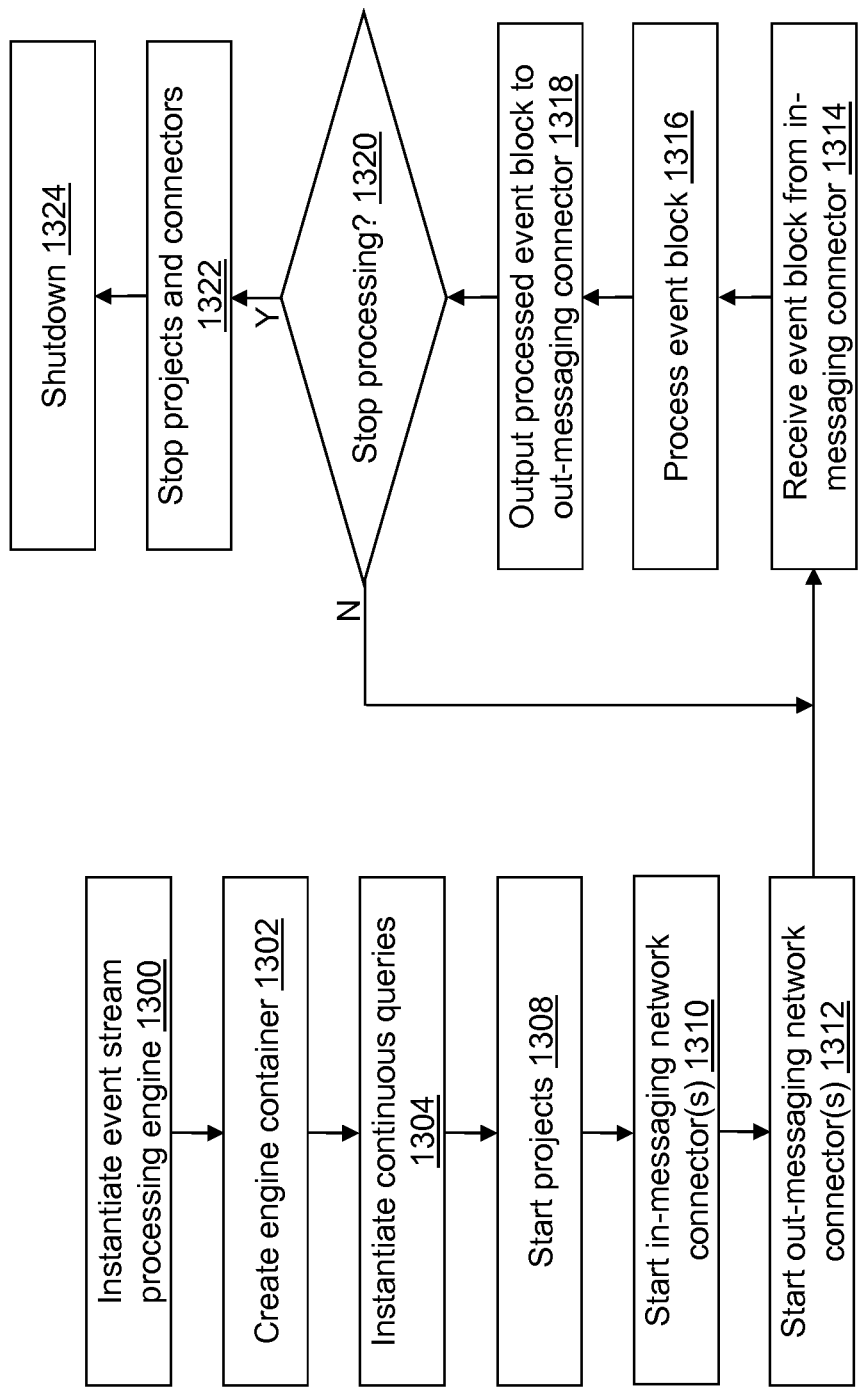
FIG. 13 depicts a flow diagram illustrating examples of operations performed by the second ESP device of FIG. 12 in accordance with an illustrative embodiment.

ESP application 416 may be modified to execute as part of second ESP system 1100. Referring to FIG. 13, further example operations associated with ESP application 416 are described. Additional, fewer, or different operations may be performed depending on the embodiment. The order of presentation of the operations of FIG. 13 is not intended to be limiting.

Similar to operation 500, in an operation 1300, ESP application 416 defines and starts ESPE 600 at ESP device 102. Similar to operation 502, in an operation 1302, the engine container is created. Similar to operation 504, in an operation 1304, the one or more continuous queries 604 are instantiated by ESPE 600 as a model.

Similar to operation 508, in an operation 1308, the one or more projects 602 are started.

In an operation 1310, in-messaging network connector 1200 is started at ESP device 102. In an illustrative embodiment, in-messaging network connector 1200 may be started as part of operation 1308. If connector orchestration is configured, in-messaging network connector 1200 may not start until another connector has started or finished. A different in-messaging network connector 1200 may be started for each source window of the source windows 606 to handle publications to each source window from in-messaging network device 1102. In an illustrative embodiment, in-messaging network device 1102 may base it's publish/subscribe capability on topics. To support topics, a topic name may be mapped to a source window of the source windows 606 of ESPE 600 by in-messaging network connector 1200. To isolate publish flows from subscribe flows to the same source window and ensure that the event block objects flow in one direction, the topic name may be appended with an "in" designator, such as "I", "in", etc.

Each started in-messaging network connector 1200 may operate as a client of in-messaging network device 1102. Connection information for connecting to in-messaging network device 1102 may be input to in-messaging network connector 1200 by ESP application 416 as part of the start of in-messaging network connector 1200, may be stored in database 414 and accessed by in-messaging network connector 1200, or may otherwise be input to or defined by in-messaging network device 1102 as understood by a person of skill in the art. Additional information input to in-messaging network connector 1200 may include the engine name of ESPE 600, the host name of ESP device 102, and the port number opened by ESPE 600.

For illustration, when in-messaging network device 1102 includes the message network offered by Tervela Inc., the connection information may include an appliance name, a client user name, a client password, and a host name or IP address of in-messaging network device 1102. The appliance name may define a client name associated with a Tervela guaranteed delivery context and may be unique among the started in-messaging network connectors 1200. The client user name may define a user name defined in the Tervela TPM. The client password may define a password associated with the client user name. The host name or IP address may define the host name or IP address of a primary Tervela TMX. The host name or IP address of in-messaging network device 1102, the client user name, and the client password may be used to connect each started in-messaging network connector 1200 to in-messaging network device 1102.

Each started in-messaging network connector 1200 may connect to the message network offered by Tervela Inc. by publishing a message to a topic defined using the appliance name. As an example, the topic may be defined as "SAS.META.appliance name". The message may include the engine name of ESPE 600, the host:port designation of ESPE 600 executing at ESP device 102, a project name of the projects 602, a continuous query name of the continuous queries 604, a source window name of the source windows 606, and a source window schema associated with in-messaging network connector 1200. The host:port field may be substituted by the engine name in topic strings used on the message network. For illustration, the topic name may be formatted as "SAS.ENGINES.engine name.project name. continuous query name.window name.IN" using the message network offered by Tervela Inc where engine name is the engine name of ESPE 600.

For further illustration, when in-messaging network device 1102 includes the message network offered by Solace Systems, the host:port of in-messaging network device 1102, a client user name, a client password, and a virtual private network (VPN) name may be included in the connection information. The topic name may be formatted as "host:port/project name/continuous query name/window name/I" where host:port is the host:port designation of ESPE 600 executing at ESP device 102. The host:port of in-messaging network device 1102, the client user name, and the client password may be used to connect each started in-messaging network connector 1200 to in-messaging network device 1102.

Each started in-messaging network connector 1200 connects to in-messaging network device 1102 with the topic name associated with the respective source window of the source windows 606. Event publishing application 224 executing at event publishing systems 104 may continue to use the ESP URL format that includes the host:port information as discussed with reference to FIG. 9. No publish/subscribe server may exist, so host:port may not be interpreted literally. Instead, it may be overloaded to identify ESPE 600 executing at ESP device 102. The engine name of ESPE 600 may be mapped to the host:port designation of ESPE 600 executing at ESP device 102 in a message sent by in-messaging network connector 1200. The topic name used in communications with in-messaging network device 1102 may be based on the string representation of the URL to ESPE 600. A event publishing systems 104 and event subscribing systems 106 know the host:port information from the URL, and substitute host:port information with the engine name in the topic name used in communications with in-messaging network device 1102.

Messaging performed by the message network offered by Tervela Inc. may use the Tervela guaranteed delivery mode. Messages may be persisted to a Tervela TPE appliance. When each started in-messaging network connector 1200 connects to in-messaging network device 1102, the connector 1200 may receive messages already published to the associated topic name over a predefined time period to enable the started in-messaging network connector 1200 to catch up with messages sent during the predefined time period. In-messaging network connector 1200 may define the time period. An example time period may be 8 hours though any time period may be defined.

For further illustration, when in-messaging network device 1102 includes the message network offered by Solace Systems, each started in-messaging network connector 1200 may subscribe to the topic "host:port/M", where host:port is the host:port designation of ESPE 600 executing at ESP device 102, which enables the started in-messaging network connector 1200 to receive query requests to ESPE 600 associated with that host:port combination.

Run-time libraries associated with in-messaging network device 1102 may be installed on ESP device 102 to support connectivity between in-messaging network connector 1200 and in-messaging network device 1102.

Similar to operation 1310, in an operation 1312, out-messaging network connector 1202 is started at ESP device 102. In an illustrative embodiment, out-messaging network connector 1202 may be started as part of operation 1308. If connector orchestration is configured, out-messaging network connector 1202 may not start until another connector has started or finished. A different out-messaging network connector 1202 may be started for each source window of the source windows 606 to handle subscription to each source window by out-messaging network device 1104. Similar to in-messaging network device 1102, in an illustrative embodiment, out-messaging network device 1104 may base it's publish/subscribe capability on topics. To support topics, a topic name may be mapped to a source window of the source windows 606 of ESPE 600 by out-messaging network connector 1202. To isolate publish flows from subscribe flows to the same source window and ensure that the event block objects flow in one direction, the topic name may be appended with an "out" designator, such as "O", "out", etc.

Each started out-messaging network connector 1202 may operate as a client of out-messaging network device 1104. Connection information for connecting to out-messaging network device 1104 may be input to out-messaging network connector 1202 by ESP application 416 as part of the start of out-messaging network connector 1202, may be stored in database 414 and accessed by out-messaging network connector 1202, or may be otherwise input to or defined by out-messaging network device 1104 as understood by a person of skill in the art. Additional information input to out-messaging network connector 1202 may include the engine name of ESPE 600, the host name of ESP device 102, and the port number opened by ESPE 600.

For illustration, when out-messaging network device 1104 includes the message network offered by Tervela Inc., the connection information may include an appliance name, a client user name, a client password, and a host name or IP address of out-messaging network device 1104. The appliance name may define a client name associated with a Tervela guaranteed delivery context and may be unique among the started out-messaging appliance connectors 1202. The client user name may define a user name defined in the Tervela TPM. The client password may define a password associated with the client user name. The host name or IP address may define the host name or IP address of a primary Tervela TMX. The host name or IP address of out-messaging network device 1104, the client user name, and the client password may be used to connect each started out-messaging network connector 1202 to out-messaging network device 1104.

Each started out-messaging network connector 1202 may connect to the message network offered by Tervela Inc. by publishing a message to a topic defined using the appliance name. As an example, the topic may be defined as "SAS. META.appliancename". The message may include the engine name of ESPE 600, the host:port designation of ESPE 600 executing at ESP device 102, a project name of the projects 602, a continuous query name of the continuous queries 604, a source window name of the source windows 606, and a source window schema associated with the connector. The host:port field may be substituted by the engine name in topic strings used on the message network. For illustration, the topic name may be formatted as "SAS.ENGINES.engine name.project name.continuous query name.window name.OUT" using the message network offered by Tervela Inc.

For further illustration, when out-messaging network device 1104 includes the message network offered by Solace Systems, the host:port of out-messaging network device 1104, a client user name, a client password, and a virtual private network (VPN) name may be included in the connection information. The topic name may be formatted as "host:port/project name/continuous query name/window name/O" where host:port is the host:port designation of ESPE 600 executing at ESP device 102. The host:port of out-messaging network device 1104 is used to connect each started out-messaging network connector 1202 to out-messaging network device 1104.

Each started out-messaging network connector 1202 connects to out-messaging network device 1104 with the topic name associated with the source window of the source windows 606. Event subscription application 324 executing at event subscribing systems 106 may continue to use the ESP URL format that includes the host:port information as discussed with reference to FIG. 10. No publish/subscribe server may exist, so host:port may not be interpreted literally. Instead, it may be overloaded to identify ESPE 600. The engine name of ESPE 600 may be mapped to the host:port designation of ESPE 600 executing at ESP device 102 by out-messaging network connector 1202. The topic name used in communications with out-messaging network device 1104 may be based on the string representation of the URL to ESPE 600.

For further illustration, when out-messaging network device 1104 includes the message network offered by Solace Systems, each started out-messaging network connector 1202 may subscribe to the topic "host:port/M" where host:port is the host:port designation of ESPE 600 executing at ESP device 102, which enables the started out-messaging network connector 1202 to receive query requests to ESPE 600 associated with that host:port combination.

Run-time libraries associated with out-messaging network device 1104 may be installed on ESP device 102 to support connectivity between out-messaging network connector 1202 and out-messaging network device 1104.

An event block object containing one or more event objects is injected into a source window of the one or more source windows 606 by an instance of event publishing application 224. The injected event block object is received by in-messaging network device 1102. In-messaging network device 1102 encapsulates the received event block object in a wrapper for transmission through in-messaging network device 1102 to the started in-messaging network connector 1200 without modification.

Similar to operation 510, in an operation 1314, the event block object received by the started in-messaging network connector 1200 is received by ESPE 600. The transmission of the event block object is coordinated using the topic name created based on the host:port/project name/continuous query name/window name.

Similar to operation 512, in an operation 1316, the event block object is processed through the one or more continuous queries 604. Similar to operation 514, in an operation 1318, the event block object is output to the started out-messaging network connector 1202. Out-messaging network connector 1202 sends the event block object to out-messaging network device 1104 that receives the event block object and wraps the received event block object for transmission through out-messaging network device 1104 to the one or more computing devices of the event subscribing systems 106.

Again, ESPE 600 maintains the event block containership aspect of the received event blocks from when the event block is published into a source window and works its way through the directed graph with the various event translations before being output to subscribers. Subscribers can correlate a group of subscribed events back to a group of published events by comparing the unique ID of the event block object that a publisher, such as publishing device 200, attached to the event block object with the event block ID received by the subscriber.

Similar to operation 516, in an operation 1320, a determination is made concerning whether or not processing is stopped. If processing is not stopped, processing continues in operation 1314 to continue receiving event block objects from the one or more computing devices of the event publishing systems 104 through in-messaging network device 1102 to the associated source window of source windows 606. If processing is stopped, processing continues in an operation 1322. In operation 1322, the started projects, in-messaging network connector 1200, and out-messaging network connector 1202 are stopped. Similar to operation 520, in an operation 1324, ESPE 600 is shutdown.

Figure 14:
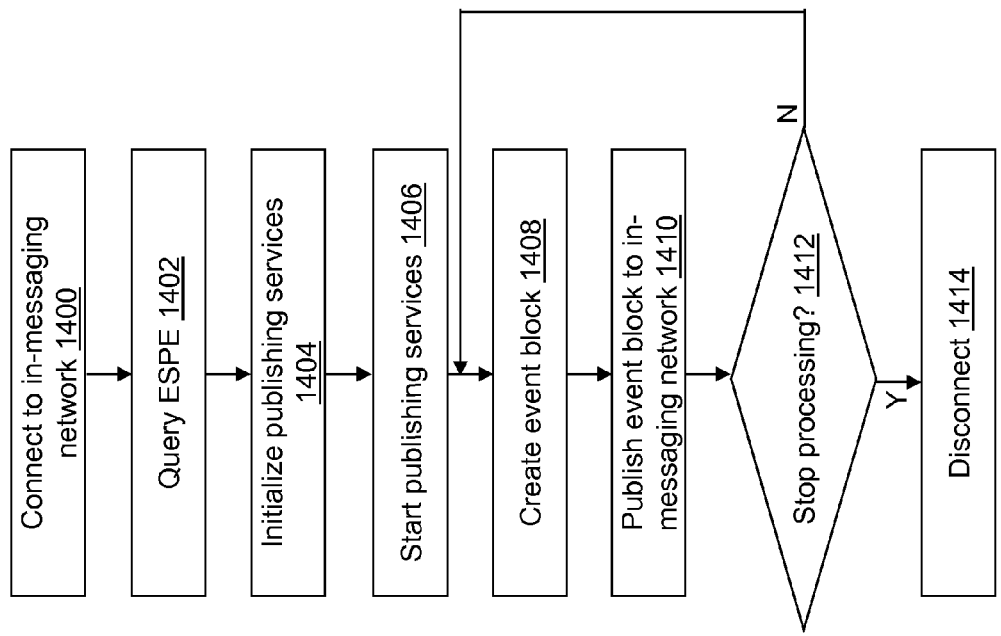
FIG. 14 depicts flow diagrams illustrating examples of operations performed by the publishing device of FIG. 2 as part of the second ESP system of FIG. 11 in accordance with an illustrative embodiment.

Referring to FIG. 14, example operations associated with event publishing application 224 are described. Event publishing application 224 may be defined to execute in second ESP system 1100. Additional, fewer, or different operations may be performed depending on the embodiment. The order of presentation of the operations of FIG. 14 is not intended to be limiting.

In an operation 1400, a connection is made to in-messaging network device 1102 with predefined connection information. The predefined connection information may be consistent with that used by in-messaging network connector 1200. For illustration, the predefined connection information may be stored in computer-readable medium 210. As an example, a function call may indicate a type of message network of in-messaging network device 1102, and a configuration file may be stored in computer-readable medium 210 that includes the predefined connection information.

For illustration, when in-messaging network device 1102 includes the message network offered by Tervela Inc., the connection information may include the appliance name, the client user name, the client password, and the host name or IP address of in-messaging network device 1102. The host name or IP address of in-messaging network device 1102, the client user name, and the client password may be used to connect to in-messaging network device 1102. For further illustration, when in-messaging network device 1102 includes the message network offered by Solace Systems, the host:port of in-messaging network device 1102, the client user name, the client password, and the VPN name may be included in the connection information. The host:port of in-messaging network device 1102 is used to connect to in-messaging network device 1102.

Similar to operation 900, in an operation 1402, ESPE 600 is queried, for example, to discover projects 602, continuous queries 604, windows 606,608, window schema, and window edges currently running in ESPE 600. The engine name of ESPE 600 and the host:port designation for ESPE 600 executing at ESP device 102 are provided as an input to the query and a list of strings may be returned with the names to the projects 602, continuous queries 604, windows 606, 608, window schema, and window edges.

In an operation 1404, publishing services are initialized as needed. For example, publishing services may not be used by in-messaging network device 1102.

In an operation 1406, the initialized publishing services are started. The publishing client, such as publishing client 802, performs the various pub/sub activities for the instantiated event publishing application 224. For example, a string representation of the URL to ESPE 600 is passed to a "Start" function. For example, the URL may include the host:port designation for ESPE 600 executing at ESP device 102, a project of the projects 602, a continuous query of the continuous queries 604, and a window of the source windows 606. The "Start" function may validate and retain the connection parameters for a specific publishing client connection and return a dedicated socket connection to the publishing client. For illustration, the URL may be formatted as "dfESP://<host>:<port>/<project name>/<continuous query name>/<window name>". If event publishing application 224 is publishing to more than one source window of ESPE 600, the initialized publishing services may be started to each source window using the associated names (project name, continuous query name, window name).

Similar to operation 908, in an operation 1408, an event block object is created by event publishing application 224. Similar to operation 910, in an operation 1410, the created event block is published to ESPE 600 through in-messaging network device 1102 using the pointer returned for the respective "Start" function call to the appropriate source window.

Similar to operation 912, in an operation 1412, a determination is made concerning whether or not processing is stopped. If processing is not stopped, processing continues in operation 1408 to continue creating and publishing event block objects. If processing is stopped, processing continues in an operation 1414. Similar to operation 914, in operation 1414, the connection made between event publishing application 224 and in-messaging network device 1102 is disconnected, and each started publishing client is stopped.

Figure 15:
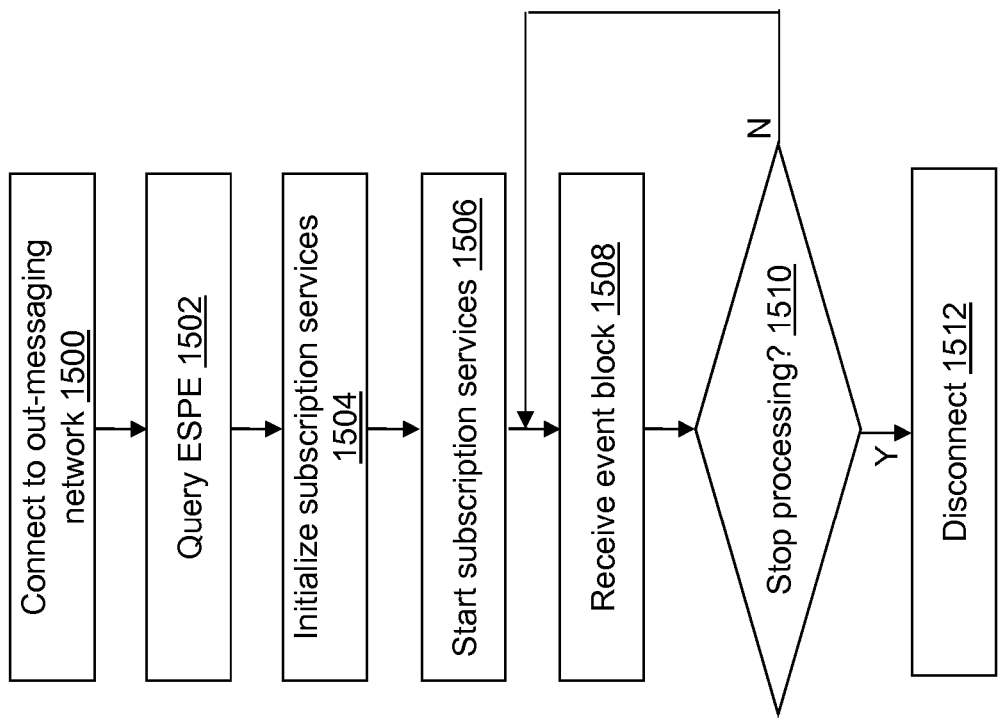
FIG. 15 depicts flow diagrams illustrating examples of operations performed by the subscribing device of FIG. 3 as part of the second ESP system of FIG. 11 in accordance with an illustrative embodiment.

Referring to FIG. 15, example operations associated with event subscription application 324 are described. Event subscription application 324 may be defined to execute in second ESP system 1100. Additional, fewer, or different operations may be performed depending on the embodiment. The order of presentation of the operations of FIG. 15 is not intended to be limiting.

In an operation 1500, a connection is made to out-messaging network device 1104 with predefined connection information. The predefined connection information may be consistent with that used by out-messaging network connector 1202. For illustration, the predefined connection information may be stored in second computer-readable medium 310. As an example, a function call may indicate a type of message network of out-messaging network device 1104, and a configuration file may be stored in second computer-readable medium 310 that includes the predefined connection information.

For illustration, when out-messaging network device 1104 includes the message network offered by Tervela Inc., the connection information may include the appliance name, the client user name, the client password, and the host name or IP address of out-messaging network device 1104. The host name or IP address of out-messaging network device 1104, the client user name, and the client password may be used to connect to out-messaging network device 1104. For further illustration, when out-messaging network device 1104 includes the message network offered by Solace Systems, the host:port of out-messaging network device 1104, the client user name, the client password, and the VPN name may be included in the connection information. The host: port of out-messaging network device 1104 is used to connect to out-messaging network device 1104.

Similar to operation 1000, in an operation 1502, ESPE 600 is queried, for example, to discover projects 602, continuous queries 604, windows 606,608, window schema, and window edges currently running in ESPE 600. The engine name of ESPE 600 and the host:port designation for ESPE 600 executing at ESP device 102 are provided as an input to the query and a list of strings may be returned with the names to the projects 602, continuous queries 604, windows 606,608, window schema, and window edges.

In an operation 1504, subscription services are initialized as needed. For example, subscription services may not be used by out-messaging network device 1104.

In an operation 1506, the initialized subscription services are started, which creates a subscribing client, such as subscribing client A 804, on behalf of event subscription application 324 at subscribing device 300. The subscribing client, such as subscribing client A 804, performs the various pub/sub activities for event subscription application 324. For example, a URL to ESPE 600 may be passed to a "Start" function. The "Start" function may validate and retain the connection parameters for a specific subscribing client connection and return a pointer to the subscribing client. For illustration, the URL may be formatted as "dfESP://<host>: <port>/<project name>/<continuous query name>/<window name>".

Similar to operation 1008, in an operation 1508, an event block object is received by event subscription application 324.

Similar to operation 1010, in an operation 1510, a determination is made concerning whether or not processing is stopped. If processing is not stopped, processing continues in operation 1508 to continue receiving event block objects. If processing is stopped, processing continues in an operation 1512. In operation 1512, the connection made between event subscription application 324 and out-messaging network device 1104 is disconnected, and the subscribing client is stopped.

Figure 16:
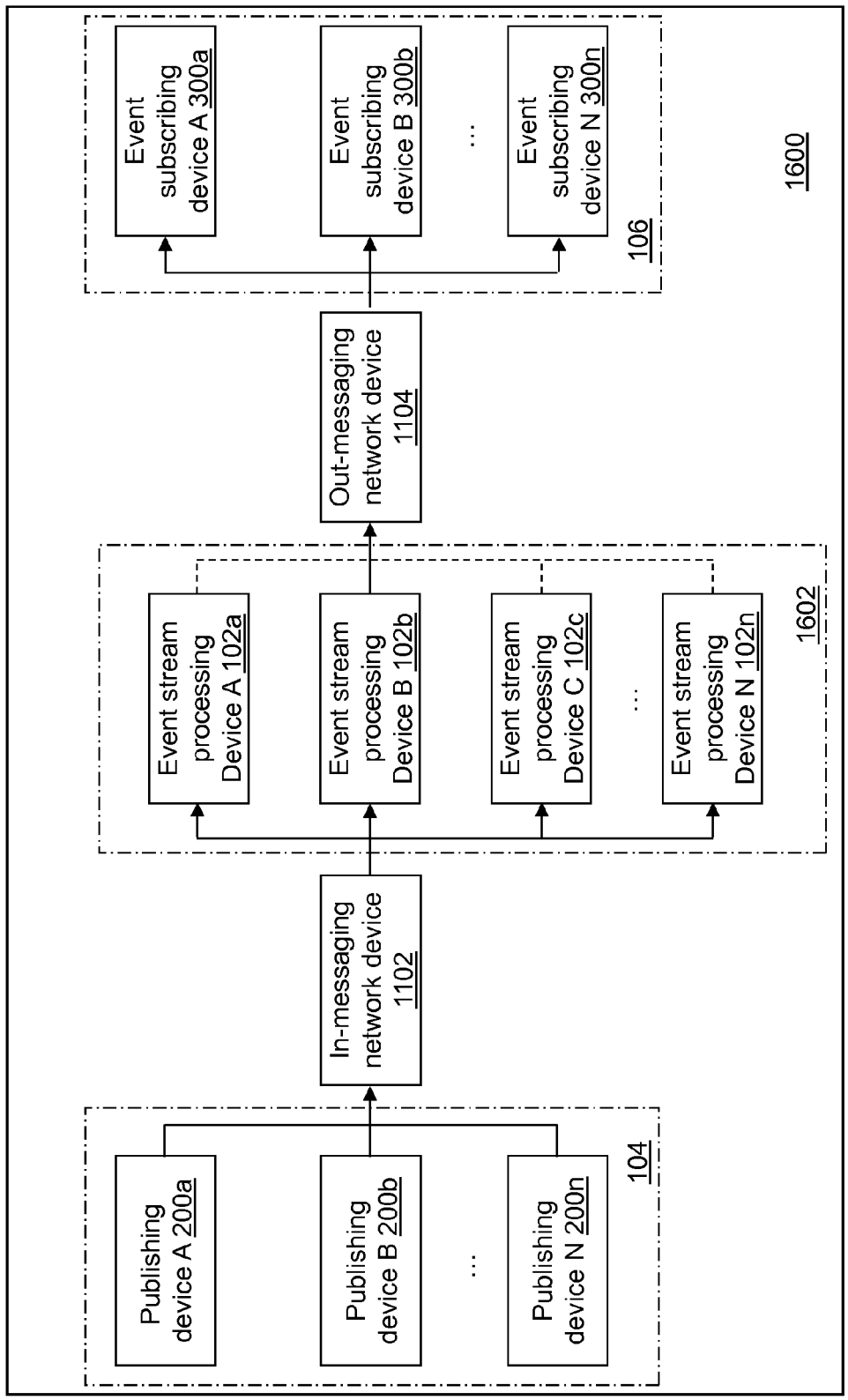
FIG. 16 depicts a block diagram of a third ESP system that supports a failover when event stream processing event blocks in accordance with an illustrative embodiment.

Referring to FIG. 16, a third ESP system 1600 is shown in accordance with an illustrative embodiment. Third ESP system 1600 may include a plurality of ESP devices 1602, event publishing systems 104, event subscribing systems 106, in-messaging network device 1102, and out-messaging network device 1104. The plurality of ESP devices 1602 create a failover ESP system by providing at least one additional ESP device as a backup if a currently active ESP fails as described further below. Having a backup insures that third ESP system 1600 continues to operate even when the currently active ESP fails. For illustration, the plurality of ESP devices 1602 may include an ESP A 102a, an ESP B 102b, ESP C 102c, . . . , and an ESP N 102n.

Though not shown, network 108 may be used to support communication between one or more components of third ESP system 1600. For example, the plurality of ESP devices 1602 may be located in a single room or adjacent rooms, in a single facility, and/or may be distributed geographically from one another. ESP device 102 is an example device of the plurality of ESP devices 1602.

Each of the plurality of ESP devices 1602 may perform the operations described with reference to FIG. 13 except that only one of the plurality of ESP devices 1602 is an active ESP device that is publishing received event block objects to out-messaging network device 1104. Each of the plurality of ESP devices 1602 may receive published event block objects from in-messaging network device 1102.

In the illustrative embodiment of FIG. 16, ESP device B 102b is indicated, using a solid line, as the active ESP device that is publishing to out-messaging network device 1104. Though the remaining ESP devices of the plurality of ESP devices 1602 are connected to out-messaging network device 1104 using their own out-messaging network connector 1202, they are not publishing to out-messaging network device 1104. The remaining ESP devices of the plurality of ESP devices 1602 may be called a failover group. The determination of which of the plurality of ESP devices 1602 is the active ESP device is determined upon initial connection by the associated out-messaging network connector 1202 to out-messaging network device 1104 and is maintained until the active ESP device fails. Out-messaging network connector 1202 running at each ESP device of the plurality of ESP devices 1602 coordinates with out-messaging network device 1104 to determine the active ESP device.

Figure 17:
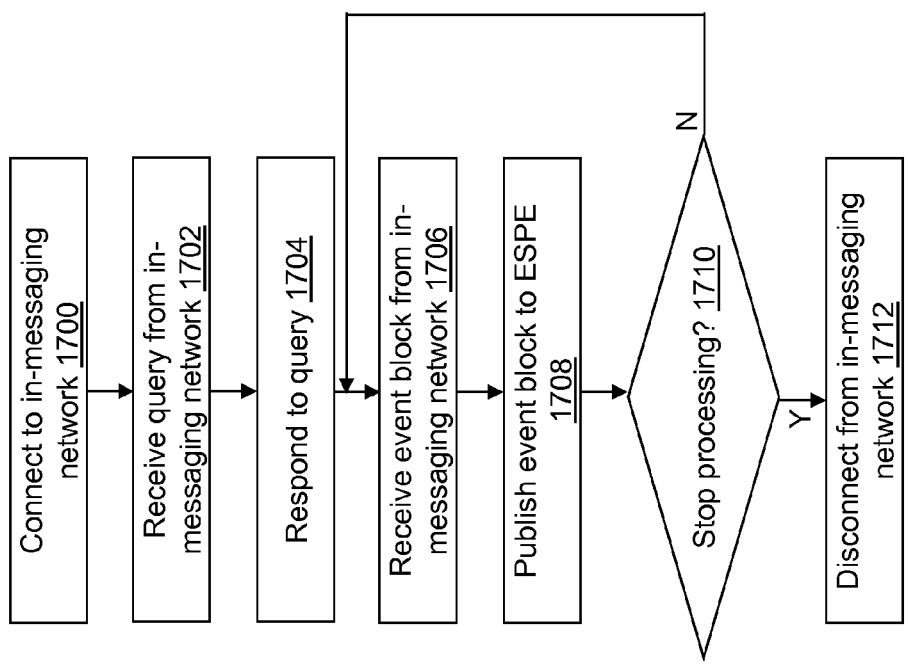
FIG. 17 depicts flow diagrams illustrating examples of operations performed by the publishing device of FIG. 2 as part of the third ESP system of FIG. 16 in accordance with an illustrative embodiment.

Referring to FIG. 17, example operations associated with in-messaging network connector 1200 are described. In-messaging network connectors 1200 may be defined to execute in third ESP system 1600 for each source window of ESPE 600 and for each ESP device of the plurality of ESP devices 1602 that is executing ESPE 600. Additional, fewer, or different operations may be performed depending on the embodiment. The order of presentation of the operations of FIG. 17 is not intended to be limiting.

In an operation 1700, a connection is made to in-messaging network device 1102 by each in-messaging network connector 1200 of each of the plurality of ESP devices 1602 with the predefined connection information as described with reference to operation 1310 of FIG. 13. For example, the predefined connection information may be stored in third computer-readable medium 410 or passed to in-messaging network connector 1200 when in-messaging network connector 1200 is started by ESPE 600. The engine name of ESPE 600 running at each of the plurality of ESP devices 1602 may be identical. Each in-messaging network connector 1200 of each of the plurality of ESP devices 1602 may be active based on the same set of topics, and may be configured with the same in-messaging network device 1102 connection information. To synchronize, each in-messaging network connector 1200 of each of the plurality of ESP devices 1602 may initiate message flow at the same time, with in-messaging network device 1102 purged of messages on related topics, and with the same initial event block object ID.

In an operation 1702, a query is received from in-messaging network device 1102. In an operation 1704, a response to the query is sent to in-messaging network device 1102. For illustration, when out-messaging network device 1104 includes the message network offered by Solace Systems, each in-messaging network connector 1200 listens for metadata requests on the topic named "host:port/M" where host:port is the host:port designation of ESPE 600 executing at ESP device 102. In-messaging network device 1102 may send formatted messages on this topic in request/reply fashion. The request messages may be sent using deliver-to-one to ensure that only one of the plurality of ESP devices 1602 responds to the message.

For further illustration, when in-messaging network device 1102 includes the message network offered by Tervela Inc., each in-messaging network connector 1200 may create a single cluster-wide inbox named "engine name_meta", which includes the engine name of ESPE 600, and may publish metadata information about special topic "SAS.META.host:port", which includes the host:port designation of ESPE 600 executing at ESP device 102. In-messaging network device 1102 may subscribe to this topic and save the received metadata and engine mapping information. To process a subsequent query from publishing device 200, in-messaging network device 1102 responds to the query with the requested information from the saved metadata. In-messaging network device 1102 may derive the inbox name using the received host:port designation of ESPE 600 executing at ESP device 102 mapped to the engine name of ESPE 600 and send formatted messages to the inbox in request/reply fashion.

In an operation 1706, the event block object is received by the started in-messaging network connector 1200 from in-messaging network device 1102. In an operation 1708, the received event block object is published to ESPE 600 based on the topic name that corresponds to a source window name of ESPE 600. In an operation 1710, a determination is made concerning whether or not processing is stopped. If processing is not stopped, processing continues in operation 1706 to continue receiving the event block objects from in-messaging network device 1102. If processing is stopped, processing continues in an operation 1712. In operation 1712, the connection to in-messaging network device 1102 is disconnected, and in-messaging network connector 1200 is stopped.

Figure 18:
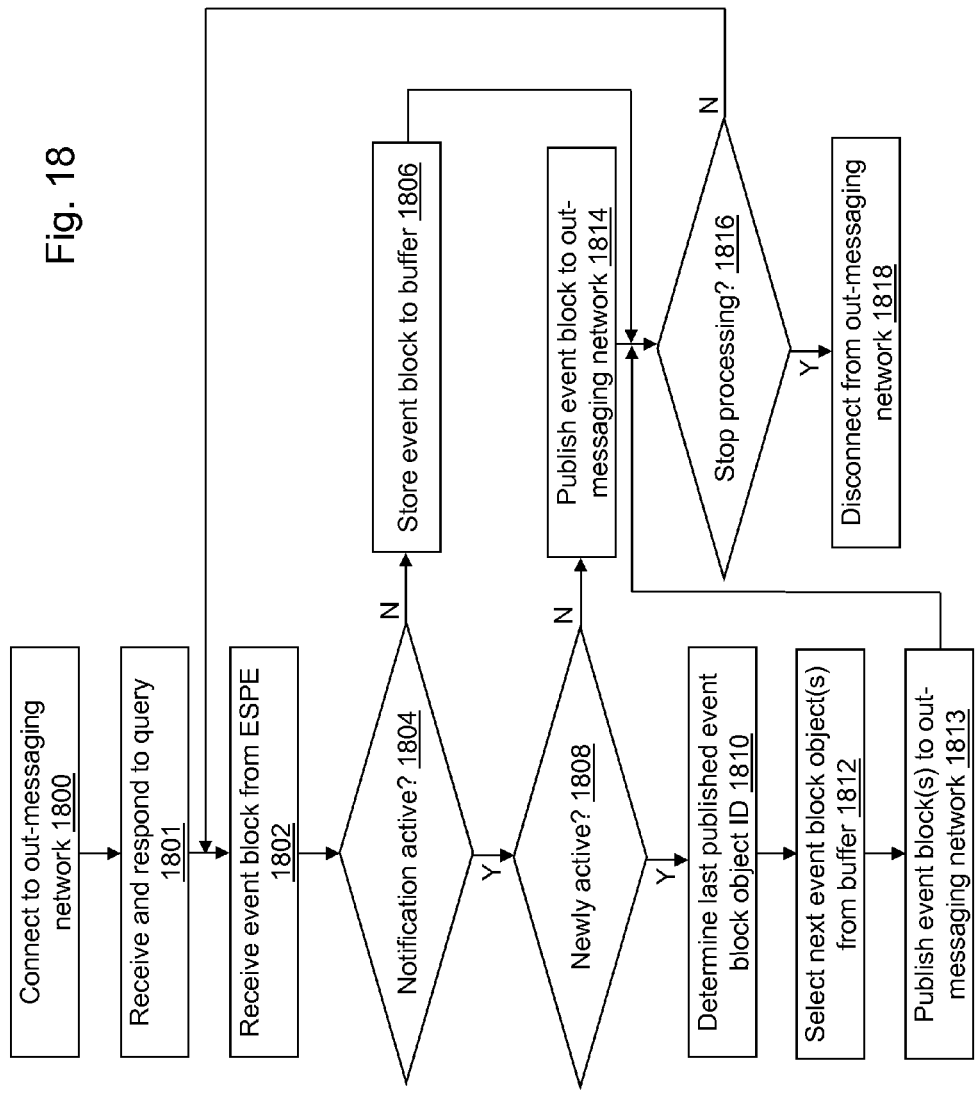
FIG. 18 depicts a flow diagram illustrating examples of operations performed by the second ESP device of FIG. 12 included as part of the third ESP system of FIG. 16 in support of a failover when event stream processing event blocks in accordance with an illustrative embodiment.

Referring to FIG. 18, example operations associated with out-messaging network connector 1202 are described. Out-messaging network connectors 1202 may be defined to execute in third ESP system 1600 for each source window and for each ESP device of the plurality of ESP devices 1602. Additional, fewer, or different operations may be performed depending on the embodiment. The order of presentation of the operations of FIG. 18 is not intended to be limiting. Out-messaging network connectors 1202 executing at each ESP device of the plurality of ESP devices 1602 in third ESP system 1600 achieve a rapid and seamless failover of any ESPE 600 running at the plurality of ESP devices 1602 without service interruption or data loss.

In an operation 1800, a connection is made to out-messaging network device 1104 by each out-messaging network connector 1202 of each of the plurality of ESP devices 1602 with the predefined connection information described with reference to operation 1312. For example, the predefined connection information may be stored in third computer-readable medium 410 or passed to out-messaging network connector 1202 when out-messaging network connector 1202 is started by ESPE 600.

Similar to operations 1702 and 1704, in an operation 1801, a query is received from out-messaging network device 1104, and a response to the query is sent to out-messaging network device 1104.

In an operation 1802, the event block object is received by the started out-messaging network connector 1202 from ESPE 600. In an operation 1804, a determination is made concerning whether or not the out-messaging network connector 1202 received a notification indicating that the out-messaging network connector 1202 is associated with the active ESP device. For example, whether out-messaging network connector 1202 is associated with the active ESP device or a standby ESP device is communicated to out-messaging network connector 1202. The notification may be determined initially when each out-messaging network connector 1202 of the plurality of ESP devices 1602 connect to out-messaging network device 1104 and when a status of one or more of the out-messaging network connectors 1202 changes due to a failed ESP device or a new ESP device joining the plurality of ESP devices 1602. When out-messaging network connector 1202 is associated with a standby ESP device, the notification may indicate that out-messaging network connector 1202 is a standby or inactive connector.

For illustration, when out-messaging network device 1104 includes the message network offered by Solace Systems, an exclusive messaging queue may be shared among each out-messaging network connector 1202 of each of the plurality of ESP devices 1602. The exclusive messaging queue is used to signal whether or not the ESP device of the plurality of ESP devices 1602 is the active ESP device. No data may be published to the exclusive messaging queue.

When out-messaging network device 1104 includes the message network offered by Solace Systems, ESP device active/standby status is coordinated among the plurality of ESP devices 1602 using the following mechanism. When each out-messaging network connector 1202 starts, the out-messaging network connector 1202 tries, as a consumer of the exclusive messaging queue, to bind to the exclusive messaging queue created for the plurality of ESP devices 1602. When out-messaging network connector 1202 is the first to bind to the exclusive messaging queue, it receives an active indicator from out-messaging network device 1104 indicating that it is associated with the active ESP device. As other out-messaging network connectors 1202 bind to the exclusive messaging queue, they receive an inactive indicator from out-messaging network device 1104 indicating that they are associated with an inactive ESP device of the plurality of ESP devices 1602. If the active ESP device fails or disconnects from out-messaging network device 1104, a next out-messaging network connector 1202 receives the active indicator from out-messaging network device 1104 indicating that it is now associated with the active ESP device. For example, the second out-messaging network connector 1202 to connect to out-messaging network device 1104 may be selected to receive the active indicator when the active ESP device fails.

For further illustration, when out-messaging network device 1104 includes the message network offered by Tervela Inc., ESP device active/standby status may be coordinated among the plurality of ESP devices 1602 using the following mechanism. When each out-messaging network connector 1202 starts, each out-messaging network connector 1202 attempts to create an inbox using the engine name of ESPE 600 for the inbox name making the inbox specific to the plurality of ESP devices 1602. If successful, out-messaging network connector 1202 receives an active indicator from out-messaging network device 1104 indicating that it is associated with the active ESP device, and the out-messaging network connector 1202 takes ownership of a system-wide guaranteed delivery context. If the inbox already exists, the active ESP device has already been selected, and the remaining out-messaging appliance connectors 1202 receive an inactive indicator from out-messaging network device 1104 indicating that they are associated with an inactive ESP device of the plurality of ESP devices 1602. The remaining out-messaging appliance connectors 1202 connect to the inbox, and send an empty message to the inbox. The active out-messaging network connector 1202 receives the empty messages from the standby out-messaging appliance connectors 1202. A first responder of the remaining out-messaging appliance connectors 1202 may be selected by the active out-messaging network connector 1202 as an active standby connector by responding to the empty message of that out-messaging network connector 1202. The active out-messaging network connector 1202 may maintain a map of the other out-messaging appliance connectors 1202 and their status. If the active out-messaging network connector 1202 receives notification of an inbox disconnect by the active standby connector, the active out-messaging network connector 1202 notifies another standby connector to become the active standby connector by responding to the empty message received from that out-messaging network connector 1202. When the active ESP device fails, the inbox also fails, and out-messaging network device 1104 sends a message to the inactive out-messaging appliance connectors 1202. When the active standby connector receives the message, the active standby connector becomes the active out-messaging network connector 1202 associated with the active ESP device, and creates a new inbox as described above to which the remaining inactive out-messaging appliance connectors 1202 connect. When the remaining standby connectors receive the message, they retain their standby status and send an empty message to the created new inbox.

If the notification is active in operation 1804, processing continues in an operation 1808. If the notification is not received in operation 1804, processing continues in an operation 1806.

In operation 1806, the received event block object is stored to third computer-readable medium 410, and processing continue in an operation 1816. For example, the received event block object may be stored in a buffer that holds a predefined number of received event block objects as understood by a person of skill in the art. When the buffer contains the predefined number of received event block objects, the oldest event block object in the buffer is removed from the buffer before storing the received event block object.

In an operation 1808, a determination is made concerning whether or not the active out-messaging network connector 1202 is associated with a newly active ESP device. A newly active ESP device is determined when the ESP device is switched from a standby status to the active status. On a subsequent iteration of operation 1808, the ESP device is not newly active because that status continues to be the active status. If the active out-messaging network connector 1202 is associated with a newly active ESP device, processing continues in an operation 1810. If the active out-messaging network connector 1202 is not associated with a newly active ESP device, processing continues in an operation 1814.

In operation 1810, an identifier of a last published event block object is determined. For illustration, when out-messaging network device 1104 includes the message network offered by Solace Systems, the active out-messaging network connector 1202 determines the last published event block object from a last value queue maintained by out-messaging network device 1104. The last value queue may have a depth of one message and contain the last message published by the previously active ESP device on the topic to which the last value queue subscribed. The out-messaging network connector 1202 associated with the newly active ESP device binds to the last value queue as a browser, retrieves the last successfully published event block object published from the last value queue, saves its event block object ID, and disconnects from the last value queue.

For further illustration, when in-messaging network device 1102 includes the message network offered by Tervela Inc., the active connector queries the system-wide guaranteed delivery context that it owns for the event block object ID of the last successfully published event block object.

In an operation 1812, one or more event block objects received after the last published event block object are selected from the buffer by identifying any event block objects with an associated event block object ID that is greater than the event block object ID of the last successfully published event block object. In an operation 1813, the selected one or more event block objects and the event block object received in operation 1802 are published to out-messaging network device 1104, and processing continues in operation 1816.

In operation 1814, the received event block object is published to out-messaging network device 1104. In operation 1816, a determination is made concerning whether or not processing is stopped. If processing is not stopped, processing continues in operation 1802 to continue receiving the event block objects from ESPE 600. If processing is stopped, processing continues in an operation 1818. In operation 1818, the connection to out-messaging network device 1104 is disconnected, and out-messaging network connector 1202 is stopped.

To guarantee that ESPE 600 executing on a rebooted ESP device can be fully synchronized with the remaining plurality of ESP devices 1602, a persist/restore feature in "guaranteed" mode can be used. For example, a state of ESPE 600 may be periodically persisted by ESPE 600 of the plurality of ESP devices 1602. The persist of the state of ESPE 600 can be triggered by ESPE 600 though this may generate redundant persist data. As another example, the active out-messaging network connector 1202 can trigger a persist by ESPE 600 executing at the active ESP device.

A location of the persist data may be the same for each ESPE 600 executing at the plurality of ESP devices 1602 so that when a failed ESP device is rebooted and reconnected, the persist data can be used to get ESPE 600 executing at the failed ESP device back to a state close to a current state of ESPE 600 executing at the remaining plurality of ESP devices 1602. ESPE 600 executing at the failed ESP device can work with out-messaging network device 1104 to receive event block objects after the persist data to fully catch up to the current state. Once caught up, ESPE 600 executing at the failed ESP device can register with out-messaging network device 1104 as a standby dependent on the type of out-messaging network device 1104 as discussed above.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. Third ESP system 1600 achieves a rapid and seamless failover of ESPE 600 running at the plurality of ESP devices 1602 without service interruption or data loss thus significantly improving the reliability of an operational system that relies on the live or real-time processing of the data streams. The event publishing systems 104, the event subscribing systems 106, and each ESPE 600 not executing at a failed ESP device is not aware of or effected by the failed ESP device. Third ESP system 1600 may include thousands of event publishing systems 104 and event subscribing systems 106. Some previous failover systems required the event publishing systems 104 and the event subscribing systems 106 to reattach to a new ESP resulting in system downtime and a loss of data. Third ESP system 1600 keeps the failover logic and awareness within the boundaries of out-messaging network connector 1202 and out-messaging network device 1104.

In an illustrative embodiment, third ESP system 1600 may be configured to operate with RabbitMQ™ provided by Pivotal Software, Inc. of London, United Kingdom. RabbitMQ™ is open source message broker software that implements the advanced message queuing protocol. For example, in-messaging network device 1102 and/or out-messaging network device 1104 may be implemented using RabbitMQ™.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A plurality of non-transitory computer-readable media configured to switch stream processing of an event block object, sent from a publishing device to a subscribing device, to a first computing device from a third computing device that has failed, the plurality of non-transitory computer-readable media comprising:
    a first non-transitory computer-readable medium comprising first computer-readable instructions stored thereon wherein, when the first computer-readable instructions are executed by a first processor, the first computer-readable instructions cause the first computing device
        to determine a first status of a first event stream processing engine (ESPE) executing at the first computing device as newly active;
        when the first status of the first ESPE is determined as newly active, to determine a last published event block object identifier as an identifier that uniquely identifies a last event block object published to an out-messaging network device;
        when the first status of the first ESPE is determined as newly active, to select a next event block object having an event block object identifier that is greater than the determined last published event block object identifier from the first non-transitory computer-readable medium;
        when the first status of the first ESPE is determined as newly active, to publish the selected next event block object to the out-messaging network device;
        to receive a first event block object from the first ESPE executing at the first computing device, wherein the first event block object includes a unique identifier of the first event block object;
to determine a first status of the first ESPE as active; and
when the first status of the first ESPE is determined as active, to publish the received first event block object to the out-messaging network device; and
a second non-transitory computer-readable medium comprising second computer-readable instructions stored thereon wherein, when the second computer-readable instructions are executed by a second processor, the second computer-readable instructions cause a second computing device different from the first computing device and from the third computing device
to receive the first event block object from a second ESPE executing at the second computing device, wherein the first event block object includes the unique identifier of the first event block object;
to determine a first status of the second ESPE as standby; and
when the first status of the second ESPE is determined as standby, to store the received first event block object in the second non-transitory computer-readable medium.

2. The plurality of non-transitory computer-readable media of claim 1, wherein a plurality of next event block objects is selected and published to the out-messaging network device.

3. The plurality of non-transitory computer-readable media of claim 1, wherein the first computer-readable instructions further cause the first computing device to establish a connection to the out-messaging network device using connection information.

4. The plurality of non-transitory computer-readable media of claim 3, wherein the second computer-readable instructions further cause the second computing device to establish a second connection to the out-messaging network device using second connection information.

5. The plurality of non-transitory computer-readable media of claim 4, wherein the connection information is received from the first ESPE, and the second connection information is received from the second ESPE.

6. The plurality of non-transitory computer-readable media of claim 3, wherein the connection information includes a host name of the out-messaging network device and a port number for publishing the selected next event block object to the out-messaging network device.

7. The plurality of non-transitory computer-readable media of claim 3, wherein the connection information includes an Internet protocol address of the out-messaging network device.

8. The plurality of non-transitory computer-readable media of claim 4, wherein, after establishing the second connection, the second computer-readable instructions further cause the second computing device to receive, from the out-messaging network device, a published event block object previously published to the out-messaging network device.

9. The plurality of non-transitory computer-readable media of claim 8, wherein the event block object previously published to the out-messaging network device was published by the first computing device.

10. The plurality of non-transitory computer-readable media of claim 8, wherein a plurality of published event block objects are received from the out-messaging network device, wherein the plurality of published event block objects were published to the out-messaging network device during a predefined time period.

11. The plurality of non-transitory computer-readable media of claim 4, wherein establishing the connection comprises attempting to create a first inbox with a first engine name of the first ESPE at the out-messaging network device, wherein establishing the second connection further comprises attempting to create a second inbox with a second engine name of the second ESPE at the out-messaging network device, wherein the first engine name of the first ESPE is identical to the second engine name of the second ESPE.

12. The plurality of non-transitory computer-readable media of claim 11, wherein determining the first status of the first ESPE as newly active comprises receiving an active indicator from the out-messaging network device in response to the attempt to create the first inbox.

13. The plurality of non-transitory computer-readable media of claim 12, wherein, after receiving the active indicator from the out-messaging network device, the first computer-readable instructions further cause the first computing device:
to receive an empty message from the second computing device;
in response to receiving the empty message, to select the second ESPE as an active standby ESPE; and
to respond to the empty message received from the second computing device.

14. The plurality of non-transitory computer-readable media of claim 11, wherein determining the first status of the second ESPE as standby comprises receiving an inactive indicator from the out-messaging network device in response to the attempt to create the second inbox.

15. The plurality of non-transitory computer-readable media of claim 14, wherein, after receiving the inactive indicator from the out-messaging network device, the second computer-readable instructions further cause the second computing device:
to send an empty message to the first computing device; and
to receive a response to the sent empty message from the first computing device indicating that the second ESPE is an active standby ESPE.

16. The plurality of non-transitory computer-readable media of claim 1, wherein, after publishing the selected next event block object to the out-messaging network device, the first computer-readable instructions further cause the first computing device:
to receive a second event block object from the first ESPE, wherein the second event block object includes a second unique identifier of the second event block object;
to determine a second status of the first ESPE as active; and
when the second status of the first ESPE is determined as active, to publish the received second event block object to the out-messaging network device.

17. The plurality of non-transitory computer-readable media of claim 1, wherein, before determining the first status of the first ESPE as newly active, the first computer-readable instructions further cause the first computing device:
to receive a second event block object from the first ESPE, wherein the second event block object includes a second unique identifier of the second event block object;
to determine a second status of the first ESPE as standby; and when the second status of the first ESPE is determined as standby, to store the received second event block object in the first non-transitory computer-readable medium.

18. The plurality of non-transitory computer-readable media of claim 1, wherein, before determining the first status of the first ESPE as newly active, the first computer-readable instructions further cause the first computing device to receive an initial event block object from the first ESPE, wherein the initial event block object includes an initial unique identifier of the initial event block object; and before determining the first status of the second ESPE as standby, the second computer-readable instructions further cause the second computing device to receive the initial event block object from the second ESPE.

19. The plurality of non-transitory computer-readable media of claim 1, wherein an engine name of the first ESPE is identical to an engine name of the second ESPE.

20. The plurality of non-transitory computer-readable media of claim 1, wherein, after storing the received first event block object in the second non-transitory computer-readable medium, the second computer-readable instructions further cause the second computing device to:
receive a second event block object from the second ESPE, wherein the second event block object includes a second unique identifier of the second event block object;
determine a second status of the second ESPE as standby;
compute a number of event block objects stored in the second non-transitory computer-readable medium;
when the computed number of event block objects exceeds a threshold, remove an oldest event block object from the second non-transitory computer-readable medium; and
when the second status of the second ESPE is determined as standby, store the received second event block object in the second non-transitory computer-readable medium.

21. The plurality of non-transitory computer-readable media of claim 1, wherein determining the first status of the first ESPE as newly active comprises receiving an active indicator from the out-messaging network device after receiving a standby indicator from the out-messaging network device.

22. The plurality of non-transitory computer-readable media of claim 1, wherein determining the last published event block object identifier comprises:
binding to a last value queue established at the out-messaging network device; and
retrieving a last successfully published event block object published from the last value queue.

23. The plurality of non-transitory computer-readable media of claim 1, wherein determining the last published event block object identifier comprises querying the out-messaging network device for the last published event block object identifier.

24. The plurality of non-transitory computer-readable media of claim 1, wherein the selected next event block object is published to a topic that includes an engine name of the first ESPE.

25. The plurality of non-transitory computer-readable media of claim 1, wherein determining the first status of the first computing device comprises:
attempting to bind to an exclusive messaging queue established at the out-messaging network device; and
receiving an active indicator from the out-messaging network device when the attempt to bind is successful.

26. The plurality of non-transitory computer-readable media of claim 1, wherein determining the first status of the second computing device comprises:
attempting to bind to an exclusive messaging queue established at the out-messaging network device; and
receiving a standby indicator from the out-messaging network device when the attempt to bind is unsuccessful.

27. A system configured to switch stream processing of an event block object, sent from a publishing device to a subscribing device, to a first computing device from a third computing device that has failed, the system comprising:
the first computing device comprising
a first processor configured to execute a first event stream processing engine (ESPE); and
a first non-transitory computer-readable medium operably coupled to the first processor, the first non-transitory computer-readable medium having first computer-readable instructions stored thereon that, when executed by the first processor, cause the first computing device
to determine a first status of the executing first ESPE as newly active;
when the first status is determined as newly active, to determine a last published event block object identifier as an identifier that uniquely identifies a last event block object published to an out-messaging network device;
when the first status is determined as newly active, to select a next event block object having an event block object identifier that is greater than the determined last published event block object identifier from the first non-transitory computer-readable medium;
when the first status is determined as newly active, to publish the selected next event block object to the out-messaging network device;
to receive a first event block object from the first ESPE executing at the first computing device, wherein the first event block object includes a unique identifier of the first event block object;
to determine a first status of the first ESPE as active; and
when the first status of the first ESPE is determined as active, to publish the received first event block object to the out-messaging network device; and
a second computing device different from the first computing device and from the third computing device, the second computing device comprising
a second processor configured to execute a second ESPE; and
a second non-transitory computer-readable medium operably coupled to the second processor, the second non-transitory computer-readable medium having second computer-readable instructions stored thereon that, when executed by the second processor, cause the second computing device
to receive the first event block object from the executing second ESPE, wherein the first event block object includes the unique identifier of the event block object;
to determine a second status of the executing second ESPE as standby; and
when the second status is determined as standby, to store the received first event block object in the second non-transitory computer-readable medium.

28. The system of claim 27, wherein the first computer-readable instructions further cause the first computing device to establish a connection to the out-messaging network device using connection information.

29. The system of claim 28, wherein the second computer-readable instructions further cause the second computing device to establish a second connection to the out-messaging network device using second connection information.

30. A method of supporting failover in an event stream processing system by switching stream processing of an event block object, sent from a publishing device to a subscribing device, to a first computing device from a third computing device that has failed, the method comprising:

determining, by a first computing device, a first status of a first event stream processing engine (ESPE) as newly active, wherein the first ESPE is executing at the first computing device;

determining, by the first computing device, a last published event block object identifier as an identifier that uniquely identifies a last event block object published to an out-messaging network device;

selecting, by the first computing device, a next event block object having an event block object identifier that is greater than the determined last published event block object identifier from a first non-transitory computer-readable medium;

publishing, by the first computing device, the selected next event block object to the out-messaging network device;

receiving, by the first computing device, a first event block object from the first ESPE executing at the first computing device, wherein the first event block object includes a unique identifier of the first event block object;

determining, by the first computing device, a first status of the first ESPE as active;

when the first status of the first ESPE is determined as active, publishing, by the first computing device, the received first event block object to the out-messaging network device;

receiving a first event block object from a second ESPE executing at a second computing device different from the first computing device and from the third computing device, wherein the first event block object includes the unique identifier of the first event block object;

determining, by the second computing device, a first status of the second ESPE as standby; and storing, by the second computing device, the received first event block object in a second non-transitory computer-readable medium.

* * * * *